United States Patent
Bharatia

(10) Patent No.: US 10,948,210 B2
(45) Date of Patent: Mar. 16, 2021

(54) SYSTEMS AND METHODS FOR INTELLIGENT THERMOSTAT

(71) Applicant: Harshal V Bharatia, Plano, TX (US)

(72) Inventor: Harshal V Bharatia, Plano, TX (US)

( * ) Notice: Subject to any disclaimer, the term of this patent is extended or adjusted under 35 U.S.C. 154(b) by 210 days.

(21) Appl. No.: 16/384,674

(22) Filed: Apr. 15, 2019

(65) Prior Publication Data
US 2019/0316799 A1 Oct. 17, 2019

Related U.S. Application Data

(60) Provisional application No. 62/658,603, filed on Apr. 17, 2018.

(51) Int. Cl.
| | |
|---|---|
| *F24F 11/46* | (2018.01) |
| *F24F 11/54* | (2018.01) |
| *F24F 11/58* | (2018.01) |
| *F24F 11/61* | (2018.01) |
| *F24F 11/64* | (2018.01) |
| *F24F 11/65* | (2018.01) |
| *F24F 11/72* | (2018.01) |
| *F24F 11/80* | (2018.01) |
| *G06N 20/00* | (2019.01) |
| *G05B 19/042* | (2006.01) |
| *F24F 120/20* | (2018.01) |
| *F24F 110/10* | (2018.01) |
| *F24F 110/12* | (2018.01) |
| *F24F 110/20* | (2018.01) |
| *F24F 110/22* | (2018.01) |
| *F24F 120/12* | (2018.01) |

(52) U.S. Cl.
CPC .............. *F24F 11/46* (2018.01); *F24F 11/54* (2018.01); *F24F 11/58* (2018.01); *F24F 11/61* (2018.01); *F24F 11/64* (2018.01); *F24F 11/65* (2018.01); *F24F 11/72* (2018.01); *F24F 11/80* (2018.01); *G05B 19/042* (2013.01); *G06N 20/00* (2019.01); *F24F 2110/10* (2018.01); *F24F 2110/12* (2018.01); *F24F 2110/20* (2018.01); *F24F 2110/22* (2018.01); *F24F 2120/12* (2018.01); *F24F 2120/20* (2018.01); *G05B 2219/2614* (2013.01)

(58) Field of Classification Search
CPC .. F24F 11/46; F24F 11/54; F24F 11/58; F24F 11/61; F24F 11/64; F24F 11/65; F24F 11/72; F24F 11/80
See application file for complete search history.

(56) References Cited

U.S. PATENT DOCUMENTS

| | | | |
|---|---|---|---|
| 6,786,421 B2 | 9/2004 | Rosen | |
| 7,331,187 B2 | 2/2008 | Kates | |
| 8,091,795 B1 | 1/2012 | McLellan | |
| 9,256,230 B2 | 2/2016 | Matsuoka | |
| 9,846,443 B2 | 12/2017 | Mucignat | |

(Continued)

*Primary Examiner* — Mark A Connolly

(57) ABSTRACT

The present invention provides systems and methods where an intelligent thermostat optimizes operation of HVAC system by learning based on thermal profile of a zone and improvising past performance with the goal of energy and cost savings while managing user comfort. The systems and methods further use adaptive clustering to dissect huge problem space, and dynamic collaboration strategy between thermostat units to rapidly enhance performance.

29 Claims, 10 Drawing Sheets

(56) References Cited

U.S. PATENT DOCUMENTS

| | | | |
|---|---|---|---|
| 2012/0273581 A1* | 11/2012 | Kolk | F24F 11/62 |
| | | | 236/91 D |
| 2013/0166075 A1* | 6/2013 | Castillo | F24F 11/30 |
| | | | 700/277 |
| 2014/0262196 A1* | 9/2014 | Frank | F24F 11/30 |
| | | | 165/251 |
| 2018/0180314 A1* | 6/2018 | Brisette | G05B 23/0281 |

* cited by examiner

SYSTEMS AND METHODS FOR INTELLIGENT THERMOSTAT

CROSS-REFERENCE TO RELATED APPLICATIONS

This application claims the benefit of U.S. provisional patent application No. 62/658,603, filed Apr. 17, 2018, the entire contents of which are incorporated herein by reference.

FEDERALLY SPONSORED RESEARCH

Not Applicable

SEQUENCE LISTING, A TABLE, OR A COMPUTER PROGRAM LISTING COMPACT DISC

Not Applicable

BACKGROUND OF THE INVENTION

A HVAC (Heating, Ventilation, Air Conditioning) system uses more than 50% of energy in a typical home, so it is important to have a good HVAC system. There are two commonly used types of systems—forced air and radiant systems. Forced air systems use a series of ducts to move air through the premise. There is a gas burner to heat the air and cooling coils to cool the air. A blower forces air through the ducts. These are cheaper and more common. Radiant heating systems use a central boiler, which is a water heater with piping, to transport steam or hot water into the living area. Heating is delivered to the rooms in the home using radiant floor slabs or underfloor piping. These are quieter, but don't filter the air like the forced air systems.

Most new homes have forced-air heating and cooling systems. In a forced air system, a furnace is used to heat the air and a condenser is used to cool it. To cool the air, an air compressor (located outside the premise) compresses a refrigerant, and sends it inside the premise to a cooling coil. A blower blows air over the cooling air, causing the heat to transfer from the air to the refrigerant in the cooling coil. The refrigerant takes this heat to the air compressor which dissipates it outside the premise. The cooled air is forced through the ducts throughout the premise.

A furnace heats the premise by burning a fuel such as natural gas or propane. The blower blows air over these gas burners, causing the heat to transfer from the burner to the air. The heated air is forced through the ducts throughout the premise.

There is significant similarity in factors that affect controlling the temperature for different types of HVAC systems. Therefore, various embodiments of this invention that describe controlling forced-air HVAC systems can also control other types of HVAC systems.

Modern HVAC systems can operate in multiple stages. Most HVAC systems lose energy when it starts and stops often. A low stage of an HVAC system consumes less energy than a high stage and therefore, it is desirable to keep a low stage running for long durations than a high stage for short durations. Moreover, the long cycles result in more effective dehumidification and this makes it more comfortable. However, low stage takes longer to change the temperature and therefore is not always practical especially when the premise leaks lot of energy under extreme conditions or a quick change in temperature is desired. Single stage HVAC systems are typically less efficient than a similar grade multi-stage system as the system requires many inefficient start and stop operations when it runs at same fixed capacity.

A thermostat should start and stop an HVAC system as minimum as possible. It is vital to operate a multistage HVAC in accordance with the leakage characteristics of the zone. If higher stages are activated often, the system becomes inefficient. On the other hand, if right stage is not used at right time, the comfort experience of the user is adversely affected as the system is not able to reach the desired temperature in time. A right balance of HVAC stages, operation of such stages for right duration, and starting of such stages at the right time is vital for an optimum system performance. Such decisions are contingent upon the thermal characteristics of a zone and therefore performance cannot be optimized without taking the individual zone's thermal profile into consideration. Most conventional programmable thermostats use a schedule that effectively shuts off thermostats when not needed and sets temperature to a fixed user comfort value when needed. The conventional thermostat strives to maintain temperature within a degree or two of a fixed value defined in the user's schedule, thereby leading to numerous start and stop events. It does so irrespective of the house thermal profile and current operating conditions, thereby leading to poor performance esp. when the outside temperature is extreme and zone quickly dissipates the energy. This is a major reason conventional thermostats are unable to cut cost.

Each degree change in thermostat schedule temperature setting results in a significant change in energy consumption, with one estimate of around three percent. In a public setting, people are more tolerant to a range of temperatures, but most thermostats build or adapt schedules that strive to maintain a fixed single temperature. Allowing a thermostat to operate using a range of temperature that users are comfortable would enable the thermostat to decide an optimum target temperature under current operating conditions and run HVAC stages for longer duration, thereby reducing the expensive startup—shutdown of HVAC stages. Conventional thermostats cannot do this and as a result expend more energy. Moreover, a user of a conventional thermostat typically cannot orient the focus of system towards efficiency versus comfort. Thus a conventional thermostat cannot adapt to conserve energy under demanding conditions and do not have any means for its users to provide energy saving guidance.

In a multi-story premise, upstairs becomes too hot in winter and downstairs becomes too cold in summers. This is attributed to the fact that hot air rises and cold air sinks. Most conventional thermostats do not have any provision to balance the temperatures across different floors. This leads to great increase in load on one of the systems, resulting in a poor performance and user experience.

Recent new products in market claim smartness by focusing more on easy user interface and access beyond the premise as opposed to optimizing energy usage without sacrificing comfort. Many of these products automatically build a user schedule based on detecting user's lifestyle. These schedules are still effectively based on a single value fixed temperature. Their smartness merely makes it convenient to build a schedule, thereby eliminating user error in building schedule, without addressing the underlying problems discussed earlier. In many cases it takes away the control from users who are familiar with their premise and schedules leading to a non-deterministic system behavior.

SUMMARY OF THE INVENTION

An aspect of the present invention is to address at least the above-mentioned problems and/or disadvantages and to provide at least the advantages described below. Consistent with embodiments of the invention, systems and methods are provided for an intelligent thermostat.

In accordance with one embodiment, a system and method to implement an intelligent thermostat by learning the thermal profile of a zone, and using this profile to determine the operation of HVAC system.

In accordance with yet another embodiment, a system and method to enable a user to specify a range of temperature for an interval of a thermostat schedule. Moreover, a comfort level enables the user to alter how strict the system attempts to adhere to maximum comfort in this range, thereby allowing user to enforce lower energy usage by relaxing the comfort level.

In accordance with yet another embodiment, a system and method to learn optimization for the usage of HVAC stage and duration to transit temperature between thermostat intervals, such optimization lowering the energy consumption and ensuring that the thermostat reliably performs the expected temperature transitions.

In accordance with yet another embodiment, a system and method to learn optimization for the usage of HVAC stage and duration to sustain temperature within a thermostat interval, such optimization maximizing user comfort and attempting to lower energy consumption.

In accordance with yet another embodiment, a system and method for a multi-story premise to feed-back the hot air from upstairs to the downstairs system during winters and cold air from downstairs to the upstairs system during summer, thereby lowering energy consumption and improving comfort.

In accordance with yet another embodiment, a system and method to collaborate between thermostat units by clustering processing for similar operations at a collaboration server in a cloud and learning to determine optimal thermostat operation parameters thereby minimizing energy usage and maximizing user comfort.

The various embodiments may include and/or exclude different aspects, features and/or advantages, where applicable. In addition, various embodiments may combine one or more aspects or features of other embodiments, where applicable.

Other aspects, advantages and salient features of the invention will become apparent to those skilled in the art from the following detailed description, which taken in conjunction with the annexed drawings, discloses exemplary embodiments of the invention. It should be understood that both the foregoing general description and the following detailed description are exemplary and explanatory only and are not restrictive of the invention.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION OF THE INVENTION

Figure 1:
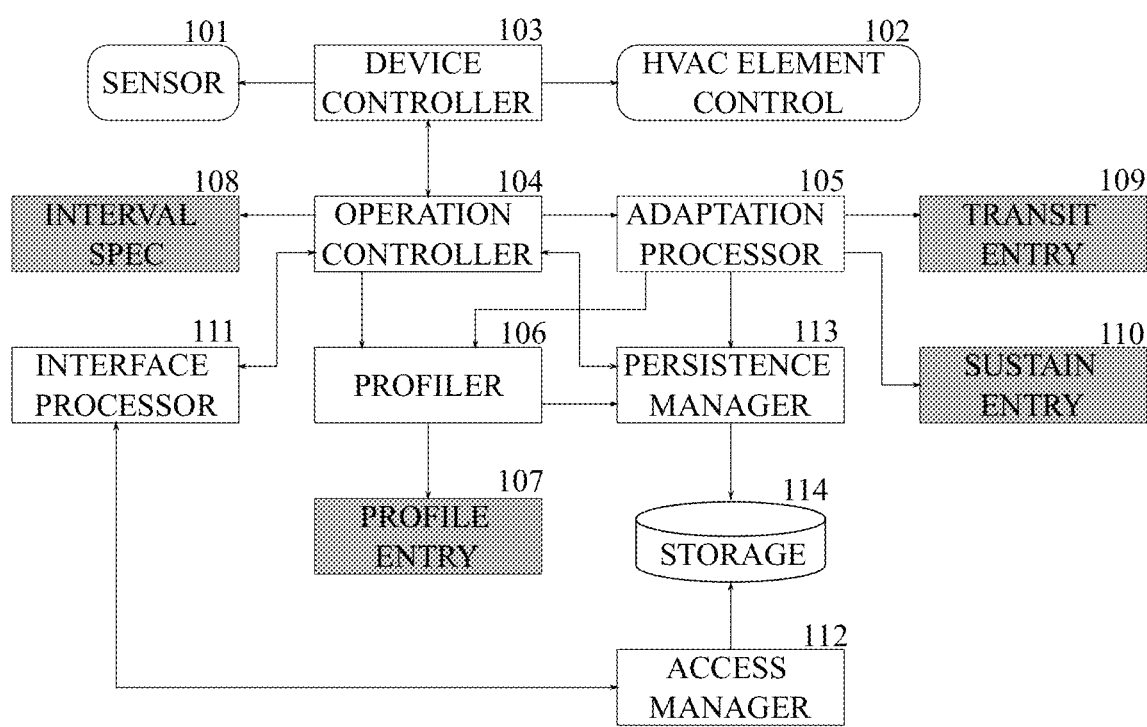
FIG. 1 illustrates a block diagram of an embodiment of a system for intelligent thermostat consistent with the present invention, with the boxes 107, 108, 109 and 110 filled in Grey color, indicating that they represent an entry that may be persisted in Storage 114. Moreover, a rounded box comprises a hardware component.

The following detailed description of embodiments of the present invention refers to the accompanying drawings. Where appropriate, the same reference numbers in different drawings refer to the same or similar elements.

References in this specification to "an embodiment", "one embodiment", "another embodiment", or the like, means that the particular feature, structure, technique or characteristic described is included in at least one embodiment of the present invention. Occurrences of such phrases in this specification do not necessarily all refer to the same embodiment. The techniques and mechanisms described herein may be embodied in several forms and manners. The invention may, however, be embodied in many different forms and should not be construed as limited to the embodiments set forth herein.

Unless specifically stated otherwise, it is appreciated that throughout the specification discussions utilizing terms such as "processing", "computing", "rendering", "determining", "running", "executing" or the like, refer to the action and/or processes of a computer or computing system or similar electronic computing device or a group of such devices, that manipulate and/or transform data represented as physical, such as electronic, quantities into other data similarly represented as physical quantities. In a similar manner, the term "processor" may refer to any device, group of devices or portion of a device that processes electronic data, e.g. from registers and/or memory to transform that electronic data into other electronic data that, e.g. may be stored in registers and/or memory. A "computer", "computing machine", "computing platform" may include one or more processors. An "implementation" is a software program or part of a software program that implements one or more functionality representative of a required work. The invention is disclosed in connection with the following additional definitions. It must be understood that these terms and their described meanings are intended to provide a thorough understanding of present disclosure and not intended to limit the scope of the present invention.

A thermostat is a device that monitors temperature and automatically regulates it as specified by the user of such device.

HVAC stands for Heating, ventilation, and air conditioning. An HVAC system is a system operated by a thermostat to regulate temperature.

A dwelling is a building or any structure where a person may reside or perform an activity.

A zone stands for an area of a premise of a dwelling whose temperature is regulated by a thermostat.

A schedule allows a thermostat to identify requirements for regulating temperature at any specific instant.

A schedule interval represents a portion of the schedule that provides information about regulating temperature within a specific interval of time. The term interval specification is used interchangeably with schedule interval when the schedule comprises one or more intervals.

A zone condition, an operating condition of a zone or a zone operating condition represents a characteristic of the zone that may affect the operation of a thermostat.

A "target temperature", "estimated target temperature" or "expected target temperature" may be used interchangeably to represent a temperature that a thermostat currently attempts to achieve for the zone.

A zone temperature is the current temperature of a zone.

A transit operation transitions the zone temperature from a schedule interval to an upcoming schedule interval. A transit processing is the processing performed by the thermostat for the transit operation.

A sustain operation sustains the zone temperature for a schedule interval. A sustain processing is the processing performed by the thermostat for the sustain operation.

A comfort range of temperature is a range of temperatures for a schedule interval. The thermostat is expected to maintain the temperature within this range, thereby ensuring user comfort for the schedule interval.

An effective cost of an operation represents the energy consumed in processing for the operation.

A collaboration server is an entity with which thermostats may communicate to collaborate processing of thermostat operations.

An equalizer baffle is a mechanism associated with an HVAC air duct that allows controlling the flow of air in the HVAC air duct. The equalizer baffle can be controlled by the thermostat such that enabling the equalizer baffle allows air flow through the HVAC air duct and disabling the equalizer baffle stops the air flow through the HVAC air duct.

An HVAC system return is part of a HVAC system which returns the air from a zone back to the HVAC system. The input of a HVAC system where the air from a zone returns back to the HVAC system is called the return input of the HVAC system.

An intelligent thermostat as disclosed in an exemplary embodiment is a thermostat that monitors temperature, regulates temperature and optimizes operation of HVAC system by learning and improvising past performance with the goal of energy savings and managing user comfort. It obtains a schedule which provides a temperature range and a comfort level specification for an interval and based on previously learned information, automatically determines the target temperature and operations necessary to maintain this target temperature such that it results in minimum energy usage and maximum user comfort. The intelligent thermostat may also be simply referred as the thermostat in this specification.

Refer now to FIG. 1, which illustrates a block diagram of an embodiment of an intelligent thermostat. The Sensor 101 represents sensors such an indoor temperature sensor that provides the thermostat information about the current indoor temperature of the zone. In another embodiment of the system, the Sensor 101 may include additional sensors that provide information such as indoor humidity, outdoor temperature and outdoor humidity. A sensor enables the thermostat to determine a current operating condition based on a sensor data item obtained from the sensor. A thermostat may regulate temperature for one or more zones in a dwelling. Without loss of generality, the techniques and mechanisms described herein may be applied to more than one zone of the dwelling. Moreover, there can be more than one thermostat in a dwelling.

The HVAC Element Control 102 represents a control interface necessary to operate various elements of an HVAC system. In one embodiment of the system, the HVAC Element Control 102 comprises a switching control that controls various aspects of the HVAC system. In another embodiment of the system, the switching control comprises a control module that controls relays that switch HVAC system controls. In yet another embodiment of the system, the switching control is collocated with the thermostat. In yet another embodiment of the system, the switching control is completely or partially distributed between the thermostat and the HVAC system.

The Device Controller 103 interacts with Sensor 101 and the HVAC Element Control 102 and controls their operation as and when required by the thermostat. It will become apparent to those skilled in the art that many design options exist for location, interfacing and communication between the Device Controller 103, Sensor 101 and HVAC Element Control 102. In one embodiment of the system, the Device Controller 103 is collocated with the Sensor 101, HVAC Element Control 102 or both. In another embodiment of the system, the Device Controller 103 communicates with the Sensor 101, HVAC Element Control 102 or both using a communication protocol. The Device Controller 103 also provides the Sensor 101 information to any other component that seeks such information. In yet another embodiment of the system, the Sensor 101, HVAC Element Control 102 or both are hardware components and the Device Controller 103 implements the necessary software to interface with the hardware. In yet another embodiment of the system, the Sensor 101, HVAC Element Control 102, or both comprises the hardware and software necessary to communicate with the Device Controller 103 implementation.

The Operation Controller 104 obtains an Interval Spec 108 and determines the operations necessary to regulate the temperature and controls the execution of these operations. The thermostat obtains one or more Interval Spec 108 that specify how the thermostat may operate during an interval. Each Interval Spec 108 includes a specification of items such as the system mode, day of week, start time of day for the interval, end time of day for the interval, high temperature limit, low temperature limit, strict at start of interval and comfort-level sought for this interval.

Figures 9, 10:
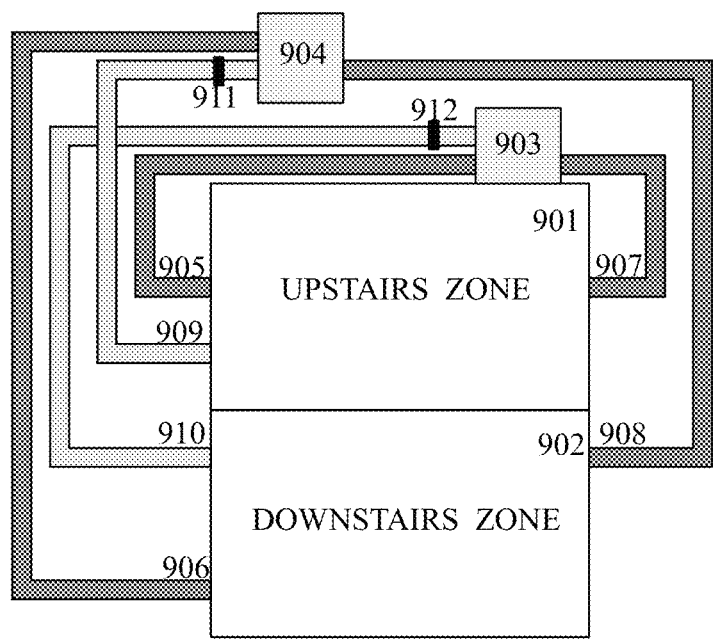
FIG. 9 illustrates an exemplary topology of using a multistory equalizer baffle.
FIG. 10 illustrates concepts of temperature range and comfort level.

Refer now to FIG. 10 which illustrates concepts of temperature range and comfort level. The high temperature limit 1002 and and low temperature limit 1001 define a window of temperature in which the thermostat is allowed to operate. The comfort level specifies how closely the thermostat is required to adhere to the most comfortable temperature limit. For cooling system mode 1005, a 100 percent comfort requires system operate close to lower temperature limit 1001 whereas for a heating system mode 1004, a 100 percent comfort requires system to operate close to high temperature limit 1002. In one embodiment, the user defines a schedule comprising a sequence of Interval Spec 108. The Interval Spec 108 in another embodiment is obtained automatically based on user's behavior and preferences.

The expected target temperature 1003 is the temperature that the thermostat is expected to normally maintain in the zone irrespective of the current operating conditions. The expected target temperature TU in this embodiment for a cooling system may be defined as $TU=T_{min}+1+((T_{max}-T_{min}-2)\times(100-CL)/100))$ and for a heating system may be defined as $TU=T_{max}-1-((T_{max}-T_{min}-2)\times(100-CL)/100))$, where TU is the expected target temperature, $T_{min}$ is the minimum interval specification temperature, $T_{max}$ is the maximum interval specification temperature, CL is percentage comfort level user setting with 100% for maximum comfort and 0% for minimum comfort (maximum savings). The thermostat attempts to meet this expected target temperature 1003 under various operating conditions. However, it uses learning to optimize its operation such that the actual target temperature is appropriate for the current operating conditions and meets the system goal of minimizing energy and maximizing comfort.

It will become apparent to those skilled in the art that the use of temperature range 1001, 1002 allows the thermostat to determine a suitable target temperature 1003. Change in actual target temperature within the specified window enables the thermostat to save energy. The concept of temperature range, enables the thermostat to alter the actual target temperature within this range, thereby opening up possibilities for energy savings. Moreover, the comfort level enables the user to dictate which of the two conflicting goals is more important to the user—comfort versus cost and energy savings. In another embodiment of the system, this behavior may be disabled to cause a single, fixed temperature by setting identical maximum and minimum temperature.

Referring again to FIG. 1 the Operation Controller 104 interacts with the Device Controller 103 to obtain information from the Sensor 101 and commands HVAC Element Control 102 to control the operation of HVAC system. In order to optimize the operation of HVAC system, the Operation Controller 104 may determine these operations based on previously learned behavior of the system. Such learning is managed using Adaptation Processor 105 and Profiler 106.

The thermostat attempts to regulate temperature of a zone under different conditions. The condition of the zone depends on many factors such as inside temperature of zone; inside humidity of zone; conditions outside the dwelling such as outside temperature, outside humidity and/or the like; conditions that depend on the construction of zone such as the thickness of wall, type of wall insulation and/or the like; characteristics of HVAC system such as the number of HVAC stages, HVAC system manufacturer, HVAC system model and/or the like; layout of the zone in the dwelling and/or the like. The thermostat obtains information about the current state of the zone using one or more sensors. A sensor detects the current state of a zone condition and provides a sensor data item to the thermostat that represents this current state. It is not essential for a thermostat to obtain sensor data item for all conditions of a zone. When more sensor data items becomes available, the thermostat discerns better between different operating conditions and improves its ability to optimize the HVAC operations. In an embodiment of the system, the thermostat obtains the sensor data item for different conditions of the zone such as inside temperature of the zone, inside humidity of the zone, temperature outside the dwelling and humidity outside the dwelling. In another embodiment of the system, the thermostat obtains the sensor data item at least for the inside temperature of the zone.

The Profiler 106 builds a thermal profile of the zone. A thermal profile enables the thermostat to estimate the HVAC stage and duration to change temperature under specific operating conditions. In one embodiment, the thermal profile is created by running an HVAC stage and recording the duration along with the operation conditions for a unit change in temperature. A similar recording is performed for a unit change in temperature when HVAC system is inactive. A comprehensive profile is created for different operating conditions representing the characteristics of the zone in which the thermostat operates. In an embodiment of the system, the thermal profile is represented as Profile Entry 107, which represents the operating conditions for a unit change in temperature using a specific HVAC stage, such entry being optionally saved in the Storage 114. An exemplary Profile Entry 107 in an embodiment comprises information such as HVAC stage, start time, end time, start indoor temperature, start indoor humidity, start outdoor temperature, start outdoor humidity, end indoor temperature, end indoor humidity, end outdoor temperature, end outdoor humidity, heating/cooling, and equalizer baffle usage. In another embodiment of the system, the thermal profile for the zone may be obtained from an external service.

The Adaptation Processor 105 assists the Operation Controller 104 to optimize the behavior of thermostat by determining an operation for current operating conditions and schedule. In one embodiment of the system, such optimization is performed based on previously learned information, predetermined logic, and/or the like. The Adaptation Processor 105, on request of the Operation Controller 104, analyzes the current operating conditions and determines operation necessary to regulate the temperature.

A transit operation is used to transition the temperature between two intervals. A sustain operation is used to sustain the temperature for an interval. When the system mode is heat, a transit operation is needed if the zone temperature is below the minimum temperature of the required comfort range of temperature for current interval. When the system mode is cool, a transit operation is required if the zone temperature is above the maximum temperature of the required comfort range of temperature for the current interval. It may also be necessary to launch a transit operation during an interval if the next interval's target temperature is required to be achieved at the start of the next interval. Each operation may require the thermostat to select and run an HVAC stage for a specific duration. Optimizing energy usage and meeting user's comfort are conflicting goals. It is undesirable to start and stop an HVAC system frequently as each such attempt incurs a significant energy loss. However, running HVAC system for extended duration hovers temperature in a wider window around target temperature, thereby compromising user's comfort. Moreover, it is not desirable to reach a target temperature before it is required as results in wasted energy. Reaching the target temperature after it is required, may save energy but it defies user's expectation and comfort. These conflicting goals can be balanced if thermostat learns to intelligently operate such that energy is used only when absolutely required, thereby reducing energy consumption. Moreover, the operations should increase user comfort without adding significant energy consumption.

In an embodiment of the system, the thermostat attempts to perform a transit operation using a minimum HVAC stage that reaches the required temperature in the required time. This saves energy as the lower HVAC stages consume less energy. Moreover, by reaching the target temperature for the transit operation at just the right time as it saves energy and meets user's expectations. No additional energy is spent to maintain the target temperature until it is required.

In an embodiment of the system, the thermostat attempts to perform a sustain operation using a minimum HVAC stage to sustain the temperature of the schedule interval. This saves energy as the lower HVAC stages consume less energy. Moreover, lower stages run longer and reduces the energy loss due to start and shutdown cycles of the HVAC system. The thermostat also attempts to move the target temperature during sustain operation to improve user comfort. When system is running in heat mode, the target temperature is moved towards the maximum temperature of the comfort range of temperature of the schedule interval. When the system is running in cool mode, the target temperature is moved towards the minimum temperature of the comfort range of temperature of the schedule interval.

In an embodiment of the system, the Adaptation Processor 105 determines a target operation to be performed for current operating conditions and schedule and then builds the target operation by determining the parameters of the target operation. The target operation comprises the transit operation and the sustain operation. The parameters of the target operation comprises time for performing the target operation, duration for which the target operation may be performed, parameters for controlling the operation of the HVAC system such as an HVAC stage. There may be additional parameters depending on the type of the target operation to be performed. Determining the parameters of the target operation parameters of the target operation is based on adaptation items comprising a representation of the thermal profile of the zone, a representation of the schedule for the operation, operating conditions for the zone and results from past target operations. The Adaptation Processor 105 determines the parameters of the target operation so that performing the target operation regulates the zone temperature to be automatically adjusted based on a comfort range of temperature specified by the schedule and results in minimizing the use of energy and offering the most user comfort for the current operating conditions and schedule. It will become apparent to those skilled in the art that the comfort range of temperature allows the thermostat to learn how to automatically adjust to an optimal temperature within this comfort range of temperature for the current operating conditions and also ensure maximizing energy savings and user comfort.

Different mechanisms may be used to obtain the parameters of the target operation. Such mechanisms include obtaining the parameters of the target operation based on a past result of performing the target operation in the thermostat, past result of performing the target operation in another thermostat, a software program interfacing with the thermostat, an additional processing implementation that can be loaded into the thermostat, a computing platform that directly or indirectly interfaces with the thermostat and/or the like.

In an embodiment of the system, the Adaptation Processor 105 determines the time of transition, the start transition temperature and target transition estimated temperature based on the current operating conditions, current Interval Spec 108 and upcoming Interval Spec 108. Based on any previously learned Transit Entry 109, the Adaptation Processor 105 determines the HVAC stage and expected duration for that HVAC stage to reach the estimated target temperature of the upcoming Interval Spec 108. The Operation Controller 104 uses the transit operation to transit the temperature and the actual operation's performance becomes usable to learn and save a Transit Entry 109. An exemplary Transit Entry 109 in an embodiment comprises information such as from interval identity, to interval identity, from temperature, to temperature, start indoor temperature, start indoor humidity, start outdoor temperature, start outdoor humidity, start transit time, end transit time, expected transit duration, heating/cooling, HVAC stage, equalizer baffle usage, and/or the like.

In one embodiment of the system, the the Adaptation Processor 105 performs a direct learning of creation and processing of the transit operation. The direct learning for transit operation creation and processing corresponds to an illustrative algorithm of following sequence of steps: determine TC as a current interval-specification estimated target temperature, TU as an upcoming interval specification estimated target temperature and $TP_{max}$ as half of duration of the current interval specification; query any previously stored Transit Entry 109 that is a closest match for TC with an entry start temperature, TU with an entry end temperature, and entry operating conditions closely matching current conditions, with allowed time less than or equal to $TP_{max}$; perform existing transit entry processing if close matching existing entries exists, and perform absent entry processing when close matching entry is absent; on completion of the transit operation, save a Transit Entry 109 representing the currently learned current operating conditions, HVAC stage and duration of the completed transit operation if necessary.

The existing transit entries processing corresponds to an illustrative algorithm of following sequence of steps: Obtain a matching entry with the lowest HVAC stage and compute MP as a duration of actual time to transit from start temperature to target temperature of the entry, and MP is less than or equal to $TP_{max}$; if no matching entry can be obtained, perform absent entry evaluation; if matching entry is obtained, use the HVAC stage and MP as the expected transit time for the transit operation.

The absent entry processing uses previously learned Profile Entry 107 to estimate an HVAC stage and expected transit time, and the absent entry processing corresponds to an illustrative algorithm of following sequence of steps: Obtain matching profile entries for current operating conditions and entry temperature ranges that fall in the range of estimated target temperatures for current transit operation; find a target profile entry list in the matched profile entries with the lowest HVAC stage and encompass entire required range of estimated target temperatures without overlap; if a target profile entry list is found, use the HVAC stage and expected transit time for the transit operation; if the target profile entry list cannot be found, use the lowest HVAC stage and $TP_{max}$ as expected time for the transit operation.

In another embodiment of the system, the Adaptation Processor 105 performs adaptation processing using one or more learning approaches including functional logic, fuzzy logic, decision tree, neural network based learning, heuristics based learning, reinforcement learning and/or the like for creation and processing of the transit operation.

In an embodiment of the system, the Adaptation Processor 105 estimates a target temperature to be sustained for the current Interval Spec 108. Based on any previously learned Sustain Entry 110, the Adaptation Processor 105 creates a sustain operation by determining the target temperature for the interval, desired range of sustaining temperature around the target temperature and the HVAC stage that enables sustaining the target temperature. The sustain operation optimizes energy consumption and maximizes user comfort. The Operation Controller 104 uses the sustain operation to sustain the temperature in current interval and the actual operation's performance becomes usable to learn and save a Sustain Entry 110. An exemplary Sustain Entry 110 in an embodiment comprises information such as interval maximum temperature, interval minimum temperature, desired sustain maximum temperature, desired sustain minimum temperature, indoor temperature, outdoor temperature, indoor humidity, outdoor humidity, comfort level, heating/cooling, HVAC Stage, equalizer baffle usage, effective cost, and/or the like.

In an embodiment of the system, the Adaptive Processor 105 learns to create a sustain operation that minimizes energy consumption and maximizes user comfort. The Adaptive Processor 105 learns to widen the sustain temperature range around a target temperature. A wider sustain temperature range enables reducing energy losses that are incurred due to starting and stopping of HVAC system. Increasing comfort level moves the target temperature, and the sustain temperature range around it, towards a more comfortable temperature but may consume more energy. The Adaptive Processor 105 learns to increase comfort level that helps overcome loss of comfort due to widening of sustain temperature range. It learns to increase comfort level so that the energy usage increases due to the increasing comfort level remains under a fixed threshold.

In one embodiment of the system, the Adaptive Processor 105 performs a direct learning for creation and processing of the sustain operation. The direct learning for sustain operation creation and processing corresponds to an illustrative algorithm of following sequence of steps: find a closest matching learned Sustain Entry 110 for the interval's maximum temperature Tmax, minimum temperature Tmin, comfort-level CL and current operating conditions; if matching Sustain Entry 110 is found, use the sustain temperature range thresholds as Dmax, Dmin and HVAC stage to create sustain operation; if matching Sustain Entry 110 is not found perform the learn sustain processing and obtain a sustain operation; on completion of sustain operation, if the current sustain operation failed to achieve expected performance, relearn by performing the learn sustain processing for current operating conditions.

The learn sustain processing corresponds to an illustrative algorithm of the following sequence of steps: obtain learning Sustain Entry 110 for the interval's maximum temperature Tmax, minimum temperature Tmin, comfort-level CL and current operating conditions; if no learning Sustain Entry 110 exists create a sustain operation with a base Sustain Entry 110 using the estimated target temperature TU for the interval to derive Dmax=TU+1, Dmin=TU−1 and the lowest HVAC stage; if there exists a base Sustain Entry 110, create a widen-range Sustain Entry 110 with Dmax to Dmin range incrementally widened at each iteration until a predetermined maximum sustain window threshold is reached or the entire range of temperature in the interval specification is covered; if there exists a widen-range Sustain Entry 110 that cannot be widened any more, create a bump-comfort Sustain Entry 110 by incrementally increasing comfort level CL and using more comfortable Dmax to Dmin range until the effective cost of increasing comfort level remains under a configured percentage of best widen-range Sustain Entry 110; if there exists a bump-comfort Sustain Entry 110 that cannot be increased any more, commit this entry as the learned Sustain Entry 110 for the current operating conditions; use the learned Sustain Entry 110 to use the sustain temperature range thresholds as Dmax, Dmin and HVAC stage to create sustain operation.

In another embodiment of the system, the Adaptation Processor 105 performs adaptation processing using one or more learning approaches including functional logic, fuzzy logic, decision tree, neural network based learning, heuristics based learning, reinforcement learning neural network and/or the like for creation and processing of the sustain operation.

The matching of Profile Entry 107, Transit Entry 109 and Sustain Entry 110 requires looking up any previously saved entries and perform a match based on the closeness of required entry parameters to corresponding parameters of the previously saved entry. It will become apparent to those skilled in the art that the matching of the entries to required entry parameters may be performed using alternatives in addition to the exemplary techniques discussed here.

In one embodiment, matching of entries corresponds to an illustrative algorithm of following sequence of steps: match all previous entries whose one or more critical parameters of interest fall in an acceptable range of parameter values and obtain a tentative entry list; the tentative entry list is then closely matched using all parameters of interest using a closest matching algorithm. In an embodiment of the system, a closest matching algorithm using euclidean distance of the required parameters to those in the saved entry is performed. In another embodiment of the system, a closest matching algorithm using weighted euclidean distance of the required parameters to those in the saved entry is performed. In yet another embodiment of the system, a closest matching algorithm using weighted euclidean distance of the required parameters to those in the saved entry is performed, wherein the weights are learned progressively. The learning of weights in an embodiment of the system is done by a gradient error analysis of the resulting operation's effective cost. The learning of weights in another embodiment of the system is done by using learning techniques such as functional logic, fuzzy logic, decision tree, neural network based learning, heuristics based learning, reinforcement learning. and/or the like. In another embodiment, the closest matching algorithm may be implemented using techniques such as functional logic, fuzzy logic, decision tree, neural network based learning, heuristics based learning, reinforcement learning and/or the like.

The Persistence Manager 113 enables storing and retrieval of information necessary for the thermostat operation from the Storage 114. In an embodiment of the system, the Storage 114 is a database and Persistence Manager 113 uses database specific mechanism to store and retrieve the information. In another embodiment, the Storage 114 is based on a custom implementation and allows a Persistence Manager 113 implementation to store and retrieve the information. In yet another embodiment, implementation of different blocks use their own dedicated Storage 114. In another embodiment, the Storage 114 is split into a remote long-term storage and a local short-term storage, with the option to optionally prune or synchronize information between them.

The Interface Processor 111 facilitates interfacing the thermostat to external interfaces and allows user to interact with the thermostat, such interaction includes configuration of the thermostat, operation of the thermostat and/or the like. The Interface Processor 111 uses an Access Manager 112 to store and access information that is required to facilitate these interactions. In one embodiment, the Interface Processor 111 implements a user interface that enables a user to interact with the thermostat, provides implementation for protocols that allows external entities to communicate with the thermostat or both. Access Manager 112 in an embodiment allows authorized users to access to the thermostat information. It will become apparent to those skilled in the art that the Interface Processor 111 and Access Manager 112 can be used to offer a standalone as well as remotely accessible interface to the users of the thermostat.

Figure 11:
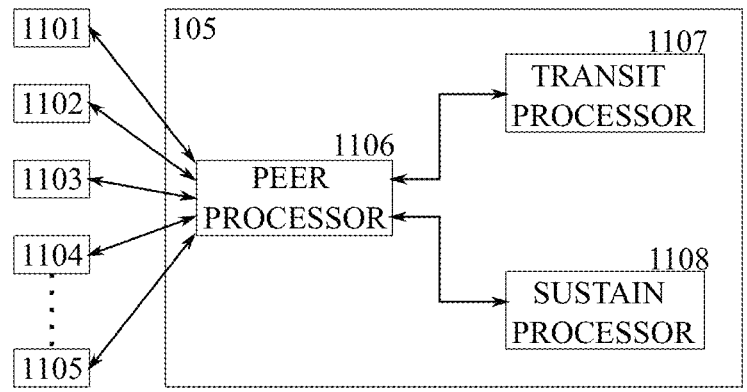
FIG. 11 illustrates exemplary processing for adaptive processor learning from other thermostat systems.

Refer now to FIG. 11 which illustrates exemplary processing for adaptive processor 105, learning from other thermostat systems. In one embodiment of the system, the adaptive processor 105 creates the thermostat operations by learning from information obtained from one or more thermostats external to the system. The peer processor 1106 obtains information from one or more other thermostats. Without loss of generality, the peer processor 1106 communicates directly or through intermediate entities that facilitate the transfer of this information. The peer processor 1106 may ensure that the other thermostats that provide information have a zone thermal profile that is similar to the thermostat. The Adaptation Processor 105 uses a transit processor 1107 to learn and create transit operation and a sustain processor 1108 to learn and create a sustain operation.

In one embodiment of the system, a neural network is used to implement a transit processor 1107 and a neural network is used to implement a sustain processor 1108. In another embodiment, a neural network is used to implement a transit process 1107 and a sustain processor 1108. In order to expedite training of a neural network, a fully or semi-trained neural network model suitable for the thermal profile of the zone can be used to initialize them, when such a neural network model is available. The initialization neural network model may be obtained from a source such as an external neural network library, a network provider that builds such neural network model from one or more external thermostat, a preprogrammed network, a default untrained neural network model, a combination of these sources and/or the like. The transit processor 1107 and sustain processor 1108 determines when learning is required and obtains their training data from the peer processor 1106 as well as locally from the thermostat. Moreover, transit processor 1107 and sustain processor 1108 may activate training using different techniques such as active all the time, active when fail to obtain operation using low HVAC stage, active when the operation fails to meet expectation and/or the like. It will become apparent to those skilled in the art that the ability to obtain the information from external sources enables the thermostat to take advantage of learning performed by the other sources, thereby significantly reducing the time to learn and improve the quality of its decisions.

In an embodiment of the system, a trained network may be used by the transit processor 1107 to determine the HVAC stage, start time and expected duration necessary to create the transit operation for the current operating conditions and upcoming interval. On completion of transit operation processing, the neural network is retrained if the operation failed to perform in the expected time.

A trained network may be used by the sustain processor 1108 to determine the sustain temperature ranges Dmax to Dmin, the HVAC stage to be used for operation and an estimated cost of operation. On completion of sustain operation processing, the neural network is retrained if the sustain operation incurs an effective cost of operation that exceeds the estimated cost of operation.

In an embodiment of the system, a trained neural network used by the transit processor 1107 and sustain processor 1108 may provide training data and initialization neural network models to other thermostats, if authorized by the user of the thermostat. Such information would be provided to one or more peer thermostats or other external entities by the peer processor 1106. It will become apparent to those skilled in the art that the ability to share the learned information with external sources enables the thermostat to participate in a wider network of entities that refine learning and enables distributed learning.

In another embodiment of the system, the peer processor 1106 creates a thermal profile for operating conditions that were not encountered before. It does so by obtaining thermal profile from peers who have a thermal profile for these operating conditions. The transit processor 1107 builds a Transit Entry 109 using this peer information and upon completion of the transit operation, it determines if it is necessary to create a thermal profile locally for these operating conditions. This eliminates the need to build a thermal profile for all possible conditions locally. The transit processor 1107 may also request the peer processor 1106 to obtain an estimation of HVAC stage and estimated time to build a transit operation for current operating condition. Upon completion of the transit operation, if transit was performed within expected time, it can save the a learned transit entry for this operating condition. The sustain processor 1108 may also request the peer processor 1106 to obtain the sustain temperature range Dmax to Dmin, HVAC stage and estimated effective cost for current operating conditions to build a sustain operation. Upon completion of the sustain operation, if actual effective cost does not exceed the expected effective cost, this Sustain Entry 110 is used to begin learning for the sustain operation. Alternatively, the sustain entry can be used as learned sustain entry if the sustain operation based on this entry performs as defined by the entry.

Figure 7:
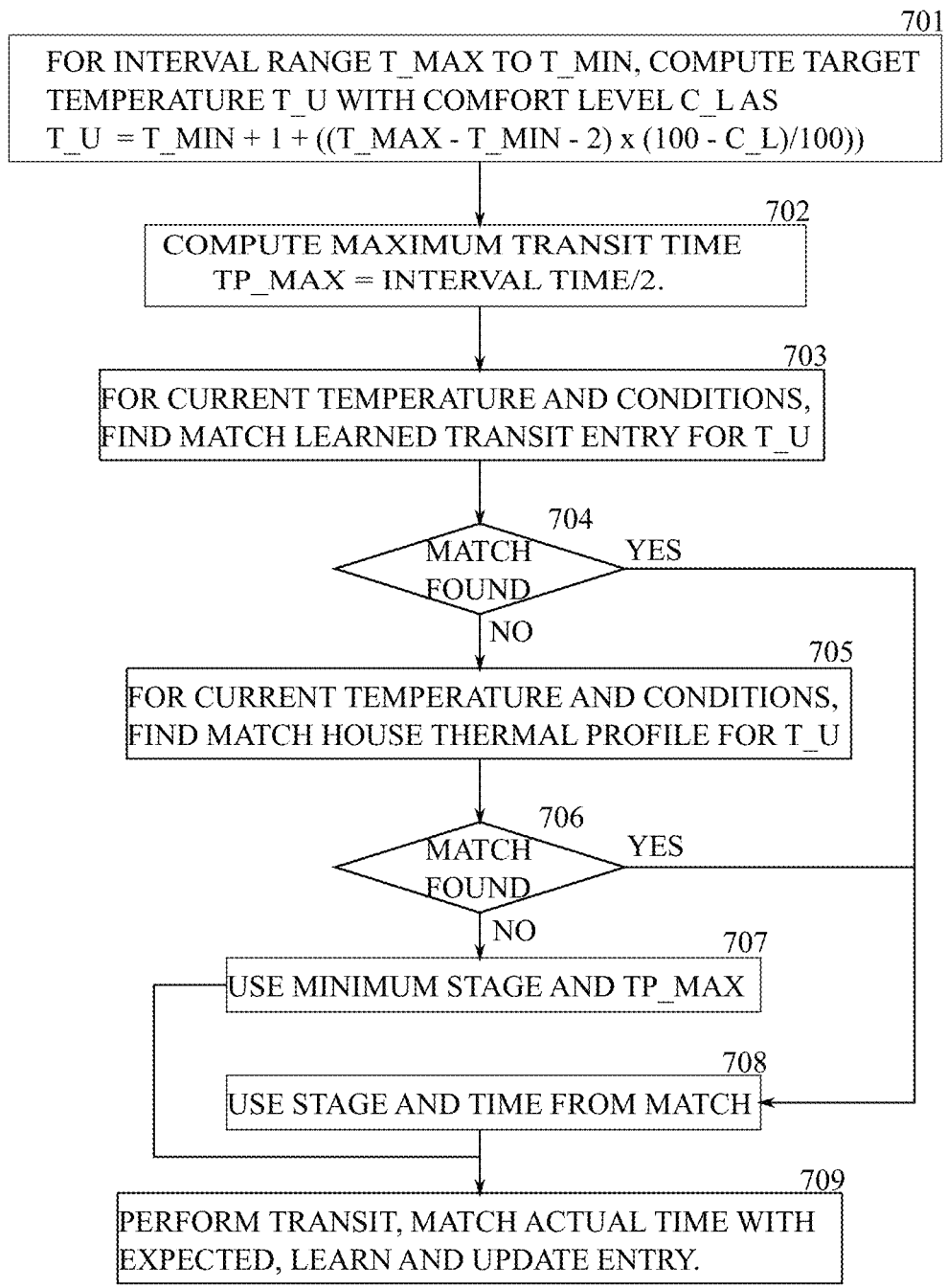
FIG. 7 illustrates a flowchart of a method to learn transiting temperature between intervals of a thermostat schedule.

In another embodiment of the system, the transit processor 1106 may use more than one learning mechanism such as a neural network and the direct learning algorithm illustrated in FIG. 7. In absence of a previously learned Transit Entry 109, the Transit Processor 1106 learns using each learning mechanisms and chooses the Transit Entry 109 that offers the lowest HVAC stage along with the lowest expected duration. The sustain processor 1108 may use more than one learning mechanism such as a neural network and the direct learning algorithm illustrated in FIG. 8. In absence of a previously learned Sustain Entry 110, the Sustain Processor 1108 learns using each of these learning mechanisms and chooses a Sustain Entry 110 that offers the best actual effective cost along with highest comfort level.

There may be a large combination of factors that affect optimal HVAC performance, including factors based on the user's schedule, operating conditions and zone configuration. An isolated thermostat would take long time and lot of computing power and resources, to learn and adapt for these combination of factors. The problem described here represents an issue prevalent when processing information for a large problem space, wherein to solve the problem with limited computing resources, it is necessary to learn to divide the large problem space into a smaller problem space and then learn to resolve the problem in the smaller problem space. It is more effective to learn how to perform effective processing for the smaller problem space than the larger problem space. It will become apparent to those skilled in the art that collaboration between thermostats promotes learning and to quickly adapt and optimize processing for these combination of factors. In an embodiment of the system, the peer processor 1106 of the adaptation processor 105 uses collaboration between thermostats, thereby enabling the adaptation processor to create the thermostat operations based on knowledge acquired from other thermostats.

The actual characteristics of a zone and an HVAC system depends on numerous parameters. However, a mathematical model for obtaining an effective cost can provide a reliable basis for comparing cost of operating an HVAC system irrespective of variations in the zone conditions and differences in HVAC systems. An Active Effective Cost Unit (AECU) represents the equivalent cost as an equivalent duration of continuously running the lowest stage of an HVAC system for the effective-cost duration in seconds. A Passive Effective Cost Unit (PECU) represents the time it takes for a zone to lose energy and is based on the thermal leakage characteristic of the zone. A combination of this AECU and PECU along with cost per second of operation of lowest HVAC stage (CPS) allows comparing cost of HVAC system operations across different systems. Systems with similar AECU, PECU and CPS may be expected to have similar thermal behavior.

Figure 12:
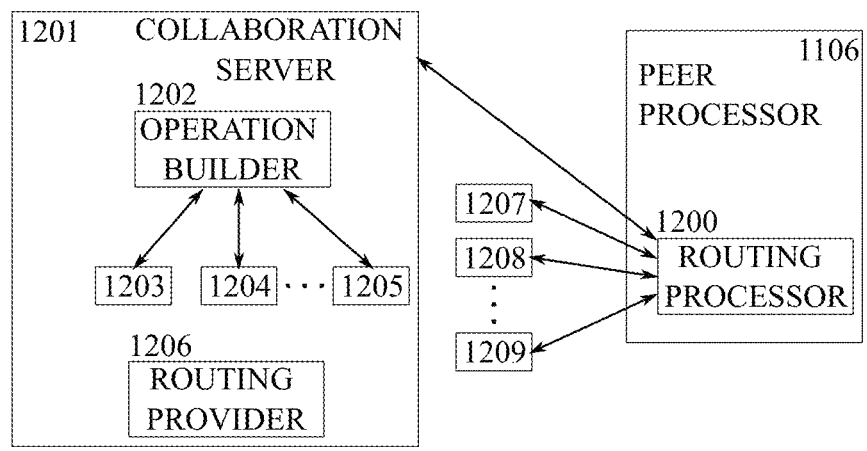
FIG. 12 illustrates an exemplary collaboration between thermostats for peer processing.

Refer now to FIG. 12 which illustrates an embodiment of the system that demonstrates an exemplary collaboration of thermostats for peer processing. The peer processor 1106 collaborates with other thermostats to enable the adaptation processor 105 in determining parameters for the target operation. The peer processor 1106 comprises a routing processor 1200 that requests a collaboration server, such as collaboration server 1201, to determine the parameters of the target operation. A cloud of collaboration servers such as 1201, 1207, 1208 and 1209 handle processing to determine the parameters of an operation based on adaptation items. The cloud of collaboration servers comprises one or more collaboration servers, each collaboration server capable to handle processing for an operation for specific operating conditions, thereby dividing the large problem space of optimizing thermostat operations across the large combination of factors into a smaller problem space of optimizing thermostat operations for a selected portion of the large combination of factors. Each collaboration server learns to optimize operations for a portion of the large combination of factors. The portion of the large combination of factors for each collaboration server in the cloud forms a basis of routing messages between the thermostat and the cloud of collaboration servers. The routing processor 1200 determines the collaboration server 1201 best capable of determining parameters of an operation for the adaptation items. A routing provider 1206 assists the routing processor 1200 to identify a collaboration server such as 1201 by managing the basis of the routing messages.

In one embodiment of the system, the routing processor 1200 uses a routing map as the basis of routing. The routing map represents an association of a collection of values for each routing parameter with a collaboration parameter. A routing provider 1206 in the cloud maintains the routing map and provides it the routing processor 1200 of a thermostat. The functionality of the routing provider 1206 may be present in one or more collaboration servers, however only one routing provider 1206 may serve as the routing provider for a thermostat. In another embodiment, the routing provider 1206 may be a standalone entity in the system and not as a part of a collaboration server. A thermostat may use different mechanisms to obtain the routing map and an update to the routing map. In one embodiment, a thermostat may obtain the routing map when routing a message and may cache the routing map for routing subsequent messages. The thermostat may reload the routing map from the routing provider 1206 when it is unable to route a message to a collaboration server. The routing map may be created and updated using different mechanisms such as associating a collaboration server to a fixed collection of routing parameter values, randomly associating a collaboration server to a collection of routing parameter value, learning to associate a collaboration server to a routing parameter value that enables clustering operations with similar characteristics to a collaboration server and/or the like. In an embodiment of the system, a combination of these mechanisms may be used such that the routing may be adapted based on the performance of the target operation.

The requesting of the collaboration server by the routing processor 1200 for determining the parameters of the target operation corresponds to an illustrative algorithm of the following sequence of steps in one embodiment of the system: using a route provider 1206 to obtain a routing map that associates a collection of routing parameter values to a collaboration server; matching the values of the routing parameters as obtained for the target operation with the corresponding values associated with a collaboration server in the routing map; selecting the matching collaboration server if routing map associates the matching collaboration server with the values of the routing parameters as obtained for the target operation; obtain a matching collaboration server by performing a routing map update if the routing map provides no matching collaboration server; and sending request to the matching collaboration server with the adaptation items for the target operation.

Performing a routing map update by the routing processor 1200 corresponds to an illustrative algorithm of the following sequence of steps: identifying the closest collaboration server for the routing parameters based on adaptation items of the target operation; updating the collection of values for the routing parameters to associate the closest collaboration server to the routing parameters based on adaptation items of the target operation; requesting the routing provider 1206 to update the routing map; obtaining the updated routing map from the routing provider 1206; and using the closest collaboration server as the matching collaboration server.

In an another embodiment of the system, the routing is managed by first communicating with a routing provider 1206. In yet another embodiment of the system, the thermostat routes messages to a routing entity and the routing entity relays the message to a collaboration server. There may be more than one routing entity allowing the system to distribute the routing processing across multiple routing entities.

Upon receiving a request to determine parameters for the target operation at the collaboration server 1201, the operation builder 1202 determines an operation build implementation such as 1203 from one or more operation build implementations 1203, 1204 and 1205. Different operation build implementation may use different strategies to learn and determine parameters for the target operation that improves the performance of the target operation. Some exemplary strategies used by the operation build implementation may include functional logic, fuzzy logic, decision tree, neural network based learning, heuristics based learning, reinforcement learning and/or the like. The operation build implementation may derive a decision knowledge item based on the results of past target operations. The decision knowledge item represents a knowledge accumulated by the operation build implementation for determining parameters for a specific target operation. This knowledge enables comparison of the effectiveness of an operation build implementation with other operation build implementations in order to reduce energy use and improve user comfort for the target operation. The operation builder 1202 selects one or more operation build implementations for the requested target operation depending on the type and adaptation items of the target operation. Each operation build implementation such as 1203, estimates the cost of target processing and a decision knowledge item based on the adaptation items of the requested target operation. The operation build implementation with the lowest cost and the best matching decision knowledge item is selected by the operation builder 1202 to determine the parameters of the target operation. The parameters of the target operation determined by the selected operation build implementation is sent to the peer processor 1106.

The target operation is created by the transit processor 1107 or sustain processor 1108 and performed by the thermostat. Upon completion of the target operation, a report of the target operation result is provided by the routing processor 1200 to the collaboration server 1201 as feedback. The operation builder 1202 determines one or more operation build implementations such as 1203, 1204 and 1205 for the requested target operation depending on a type and parameters of the target operation. The operation build implementation learns based on this feedback obtained from the thermostat and updates the decision knowledge item to reflect the effect of this learning for handling future similar target operations. It will become apparent to those skilled in the art that the system of this exemplary embodiment learns to provide information for an operation by using previously reported operation result for the operation in similar operating conditions from the requesting or some other thermostat, thereby collaborating for the operation information between these thermostats.

In an embodiment of the system the operation build implementation comprises of a neural network. It is possible to use various types of neural network configurations including a fully connected deep neural network, a recurrent deep neural network and/or the like. The input of the neural network is derived from the adaptation items of the target operation and the parameters of target operation are derived from the output of the neural network. When splitting an existing operation build implementation to multiple operation build implementation across multiple collaboration servers, it may not be necessary to retrain the neural network model for the resulting operation build implementations as the neural network model for the existing operation build implementation completely represents all samples which are split across resulting multiple operation build implementations. Splitting the target operation results at an existing operation build implementation may be done by finding value of a routing parameter such as AECU, PECU, CPS and/or the like that may evenly split the number of operation results across the resulting multiple operation build implementations.

The processing performed by the collaboration server such as 1201 for determining the parameters of the target operation corresponds to an illustrative algorithm of the following sequence of steps in one embodiment of the system: obtaining adaptation items for determining the parameters of the target operation; identifying one or more operation build implementations such as 1203, 1204 and 1205 to determine the parameters of the target operation; deriving a decision knowledge item based on one or more past target operation results; estimate the cost of performing the target operation for each operation build implementation based on the decision knowledge item and the adaptation items for the target operation; select an operation build implementation such as 1203 that best matches the decision knowledge item for the adaptation items and with lowest estimated cost of performing the target operation; use the selected operation build implementation such as 1203 to determine the parameters for the target processing using the adaptation items for target operation and send these determined parameters for the target processing to the thermostat; obtain the result of performing the target operation with its parameters and use it to update the decision knowledge item for each operation build implementation such as 1203, 1204 and 1205.

Figure 2:
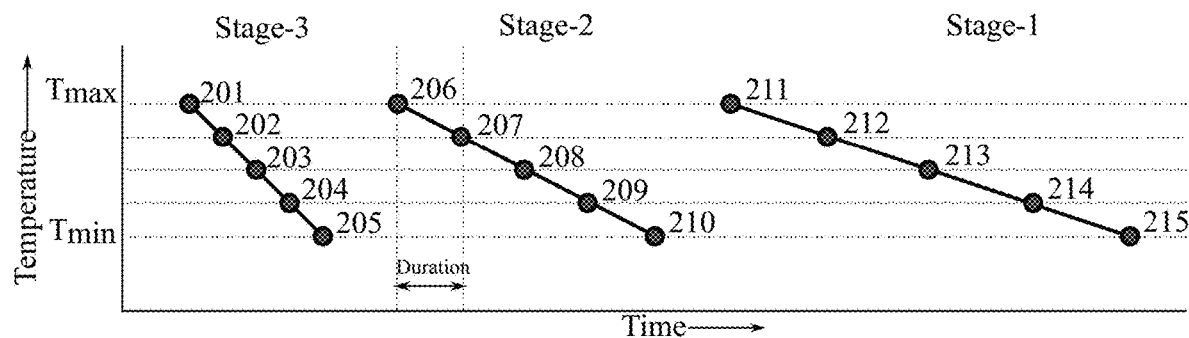
FIG. 2 illustrates an exemplary processing to build a thermal profile.

Refer now to FIG. 2 which illustrates an exemplary run by Profiler 106 to create a thermal profile for a cooling HVAC system. The Profiler 106 evaluates the schedule and determines the maximum temperature Tmax and minimum temperature Tmin across all intervals specified in the schedule. It starts running the highest HVAC stage 3 and creates a Profile Entry 107 at 201 to 205, one for each degree changes in temperature. It repeats this with next stages 2 and 3 and creates a Profile Entry 107 for 206 to 210 and 211 to 215 respectively.

Figure 3:
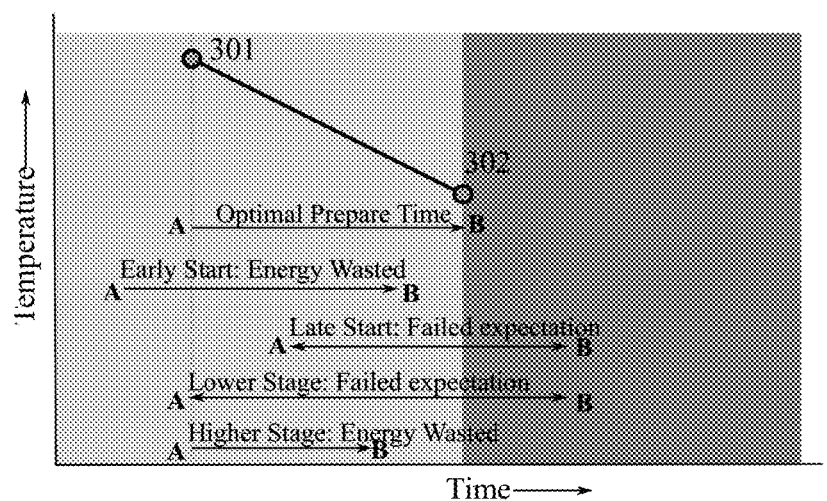
FIG. 3 illustrates an exemplary processing to transit to a new interval of a thermostat schedule.

Refer now to FIG. 3 which illustrates an exemplary run of a transit operation by a cooling HVAC stage and highlights the trade-offs to be considered while learning for a transit operation by the Adaptation Processor 105. 301 corresponds to a temperature for current interval and 302 corresponds to estimated target temperature for an upcoming interval. The transit operation starts at an optimal time and uses an optimal HVAC stage. If it begins early, the temperature at 302 is reached before it is required, resulting in energy lost in sustaining the temperature at 302. If it begins late, the temperature at 302 is not reached in time, thereby defying user's expectation. If HVAC stage is too low, the temperature at 302 is not reached in time, thereby defying user's expectation. On the other hand, if HVAC stage that is too high, the temperature at 302 is reached before it is required, resulting in energy lost in sustaining the temperature at 302. Thus the Adaptation Processor 105 has to use an optimal HVAC stage and start the transit operation at an optimal time. The past transit operation behavior under similar operating conditions is used to learn the optimal HVAC stage and optimal time.

Figure 4:
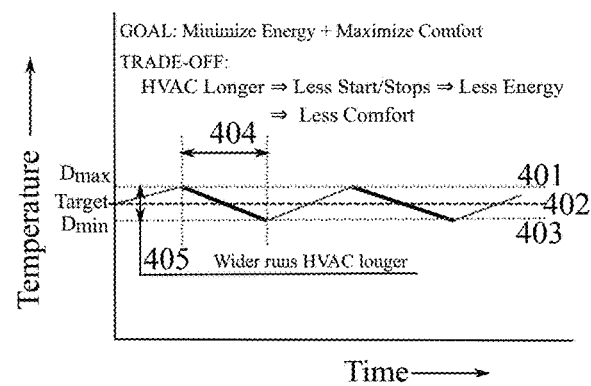
FIG. 4 illustrates an exemplary processing to sustain temperature within an interval.

Refer now to FIG. 4 which illustrates an exemplary run of a sustain operation by a cooling HVAC stage and highlights the trade-offs to be considered while learning for a sustain operation by the Adaptation Processor 105. It is necessary to optimize energy use and maximize comfort during a sustain operation. 402 is the target temperature of the interval that the operation strives to sustain. It does so by ensuring that the temperature remains bound within the sustain temperature range 401 to 403. The HVAC system runs until temperature goes from 401 to 403, for duration 404. When the desired sustain temperature range 405 is wide, the duration 404 becomes longer, thereby resulting in fewer start-stop cycles of the HVAC system in the interval. Each such start-stop cycle leads to lot of wasted energy. Thus when the sustain temperature range 405 is wider, it leads to lower energy consumption. However, since the temperatures 401 and 403 deviate more from the target temperature 402, it leads to less comfort as 401 is now warmer than temperature 402. Therefore, the Adaptation Processor 105 attempts to learn a compromise that increases comfort, reduces temperature 402 in a cooling system, and reducing both temperatures 401 and 403.

Figure 5:
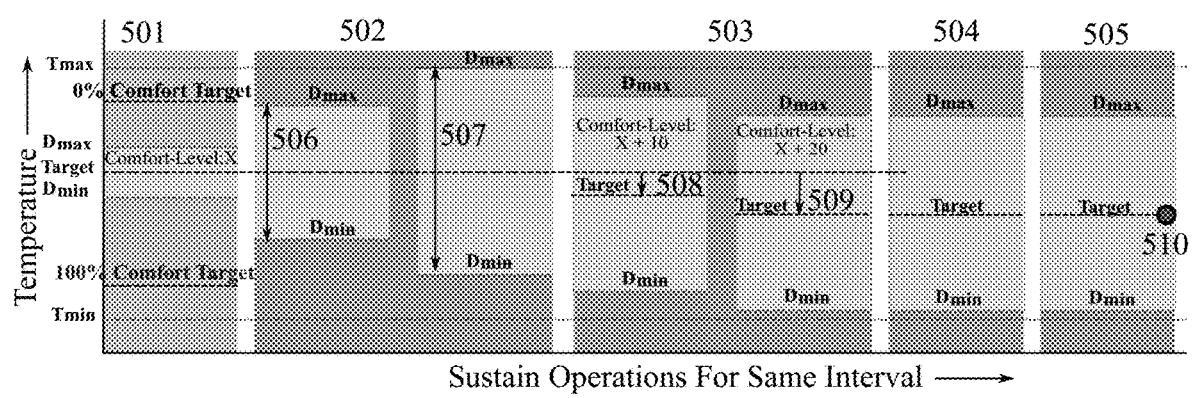
FIG. 5 illustrates an exemplary processing of various phases of sustain processing within an interval.

Refer now to FIG. 5 which illustrates an exemplary sustain operation for a cooling system interval created by the Adaptation Processor 105, demonstrating its stages of learning. Stage 501 represents creation of Sustain Entry 110 when there is no learned Sustain Entry 110 or a base learned entry is obtained from some other source for the current operation conditions. Stage 502 is widen-range where the sustain temperature range is widened as 506 and 507 until entire range of temperature in the interval specification is covered or maximum sustain temperature window threshold is reached. Stage 503 is bump-comfort where comfort level is incremented causing the target temperature to be increased towards a more comfortable target temperature 508 and 509 until the effective cost of increasing up comfort remains under a configured percentage of best Sustain Entry 110 in 502. Stage 504 represents finished learning where the learned Sustain Entry 110 is committed. Stage 505 henceforth uses the learned Sustain Entry 110, triggering a relearning at 510 if the sustain operation performance deteriorates.

Refer now to FIG. 9 which illustrates an exemplary topology for a multistory equalizer baffle. A multistory equalizer baffle reduces energy consumption in a multistory premise by equalizing temperature across zones at different levels of a premise. The upstairs zone 901 uses an HVAC system 903 with its regular input air duct 905 and the conditioned output air duct 907. The downstairs zone 902 uses an HVAC system 904 with its regular input air duct 906 and the conditioned output air duct 908. Without loss of generality, the topology illustrates a single air duct for input and output. However, an actual installation may use more than one air duct for input and output. An air-duct 910 from the downstairs zone to return input of upstairs HVAC system 903. Moreover, the air-duct 910 has an equalizer baffle control valve 912 that enables the thermostat to activate flow of air from the downstairs zone 902 for the upstairs zone 901 through the HVAC system 903. Similarly, an air-duct 909 from the upstairs zone to return input of downstairs HVAC system 904. The air-duct 909 has an equalizer control valve 911 that enables the thermostat to activate flow of air from the upstairs zone 901 to the downstairs HVAC system 904.

In winter the upstairs zone 901 becomes hot as the heated air from the downstairs zone 902 rises up. This heats up upstairs zone 901 leading to minimal use of upstairs HVAC system 903 and significantly more use of downstairs HVAC system 904. When the thermostat activates the equalizer baffle control valve 911, the already heated air comes in 904 which uses it to heat the downstairs zone 902. This helps save energy as the downstairs HVAC system 904 takes in the upstairs heated air with the downstairs cooler air and heats the resulting mixture.

In summer, the downstairs zone 902 becomes cooler as the cool air from the upstairs zone 901 sinks down. This causes upstairs HVAC system 903 to work much harder than the downstairs HVAC system 904. When the thermostat activates the equalizer baffle control valve 912, the already cool air comes in 903 which uses it to cool the upstairs zone 901. This helps save energy as the upstairs HVAC system 903 takes in the downstairs cool air with the upstairs warmer air and cools the resulting mixture.

It will become apparent to those skilled in the art that the multistory equalizer baffle allows the thermostat to feed back the hot air from an upstairs zone to the downstairs zone during winters and cold air from the downstairs zone to the upstairs zone during summer By offering a more balanced distribution of workload between the zones on different floors, the thermostat offers additional energy savings, better comfort and a consistent behavior.

Refer now to FIG. 10 where a 0% Comfort signifies maximum saving in energy. In one embodiment of the system, a blackout mitigation mechanism allows an energy provider to activate a thermostat mode of operation which uses minimum energy. On activation of blackout mitigation, the thermostat operates with zero percent comfort level for all intervals. The energy provider may signal the need to conserve energy to the thermostats by providing a hardware signal to thermostats equipped with a sensor to detect this hardware signal. Alternatively, the energy provider may send a network message to thermostats that register for such information on a data communication link. Furthermore, the energy provider may update a conserve status indicator at a known network location. Thermostats capable accessing this known network location may obtain this conserve status indicator. A thermostat may support any combination of these alternatives to detect a signal from the energy provider to conserve energy.

Refer again to FIG. 1, which illustrates a block diagram of an embodiment of an intelligent thermostat. It will become apparent to those skilled in the art that the functionality represented by the blocks described in the block diagram of FIG. 1 may be implemented in different configurations of computing devices. Moreover, it is possible for an implementation to collapse or split functionality of blocks across one or more computing devices. The thermostat can control one or more HVAC systems, thereby allowing the thermostat to control one or more zones. Each zone would have its own one or more sensors 101 and own HVAC element control 102 for its HVAC system.

Without loss of generality, some exemplary configurations of computing devices are discussed here. These configurations are illustrative and does not limit the scope of embodiments of this invention. In an exemplary configuration, blocks 101, 102, 103, 104, 105, 106, 111, 112, 113 and 114 are implemented on a single computing device. In another exemplary configuration, the Sensor 101, HVAC Element Control 102 and a portion of Device Controller 103 are implemented on a single computing device. A portion of the Device Controller 103 and rest of the blocks 104, 105, 106, 111, 112, 113 and 114 are implemented on another single computing device, such that the Device Controller 103 portions on the two devices communicate with each other. In yet another exemplary configuration, 101, 102, 103, 104 resides on a single device and 105, 106, 111, 112, 113 and 114 are implemented on another device, the latter device could optionally be a shared computing platform that performs processing for one or more thermostats. In another exemplary configuration, the Storage 114 is split into two portions, a local portion that resides with the rest of the system and another portion is remote. Information from remote location is loaded into the local location at initialization, on demand, or both. The remote location may optionally receive updates from the local location. In another exemplary configuration, implementation of different blocks use their own dedicated Storage 114.

Figure 6:
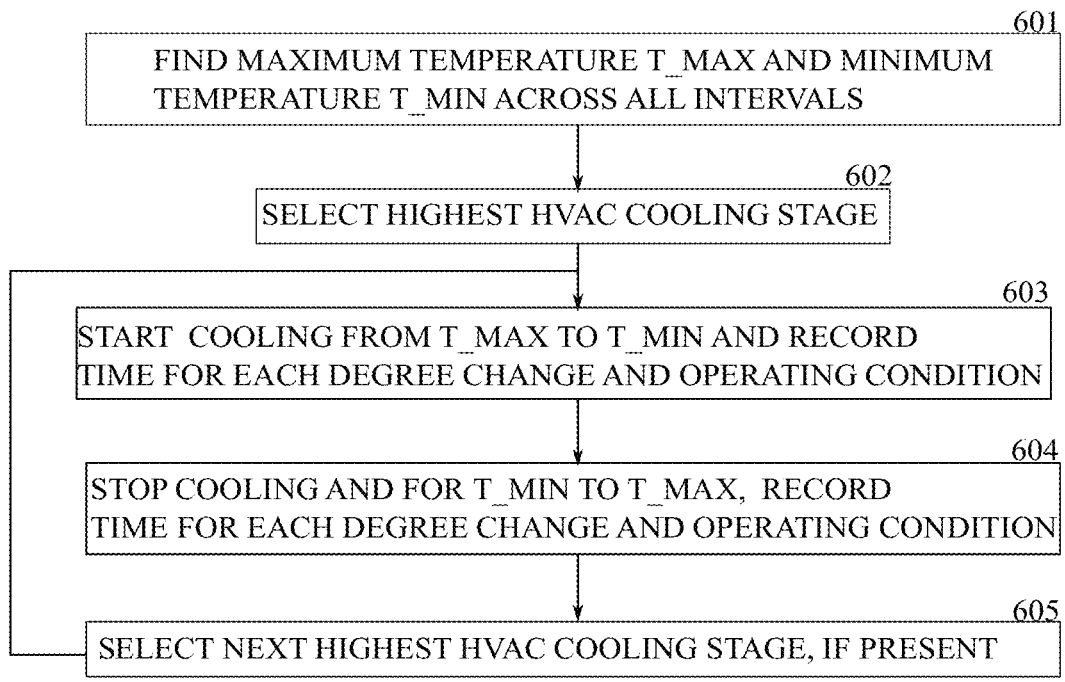
FIG. 6 illustrates a flowchart of a method for building a thermal profile.

Refer now to FIG. 6 which illustrates flowchart of an exemplary method for building a thermal profile for a zone for the cooling system mode Similar flowchart can be used for the heating system mode.

In stage 601, the schedule is analyzed to determine the maximum temperature Tmax and minimum temperature Tmin across all intervals in the schedule for the current system mode.

In stage 602, the highest HVAC cooling stage is selected. The profiling begins with the highest stage and is then performed for lower stage.

In stage 603, the thermostat activates HVAC stage which begins cooling the zone. If the current temperature cannot be Tmax, cooling begins from the current temperature until Tmin is reached. At each degree change in temperature a Profile Entry 107 is created and the time required for the degree change along with the current operating conditions are recorded.

In stage 604, the thermostat stops the HVAC stage, thereby causing the temperature of the zone to rise above Tmin until it reaches highest possible temperature allowed by the current operating conditions. At each degree change in temperature a Profile Entry 107 is created and the time required for the degree change along with the current operating conditions are recorded.

In stage 605, next highest HVAC stage is selected and steps 603 to 605 are repeated until there are no more HVAC stages left.

Refer now to FIG. 7 which illustrates flowchart of an exemplary method to learn transiting temperature between intervals of a thermostat cooling schedule. Similar flowchart can be used for the heating system mode.

In stage 701, the upcoming interval's temperature range Tmax to Tmin and user specified comfort level CL for the upcoming interval is used to compute the estimated target temperature for the upcoming schedule as TU=Tmin+1+((Tmax−Tmin−2)×(100−CL)/100)). This transit operation's goal is to transit from current temperature to the estimated target temperature TU.

In stage 702, compute the maximum time allowed to transit as half of the total time of a current interval, TPmax=Interval Time/2

In stage 703, find matching learned Transit Entry 109 which corresponds to the current temperature, the estimated target temperature of upcoming interval and current operating conditions.

In stage 704, determine if there are any matching learned Transit Entry 109.

Stage 705 is reached if no matching learned Transit Entry 109 were found during stage 704. In stage 705, the zone thermal profile is used to find one or more matching Profile Entry 107 using the current temperature, the estimated target temperature of upcoming interval and current operating conditions.

In stage 706, determine if there are any matching Profile Entry 107.

Stage 707 is reached if no matching Profile Entry 107 were found during stage 706. In stage 707, default values of minimum cooling stage and TPmax are used to create the transit operation due to lack of any useful previously learned information.

Stage 708 is reached if a matching entry was found during stages 704 or 706. In stage 708, an HVAC stage and an estimated time are obtained from the matching entry and used to create the transit operation.

Stage 709 is reached after transit operation is created in stages 707 or 708. In stage 709, perform the transit operation and upon its completion, learn and update the learned information for this transit operation. If the actual time of transition was not as expected, it may be updated in the Transit Entry 109 for this operation.

Figure 8:
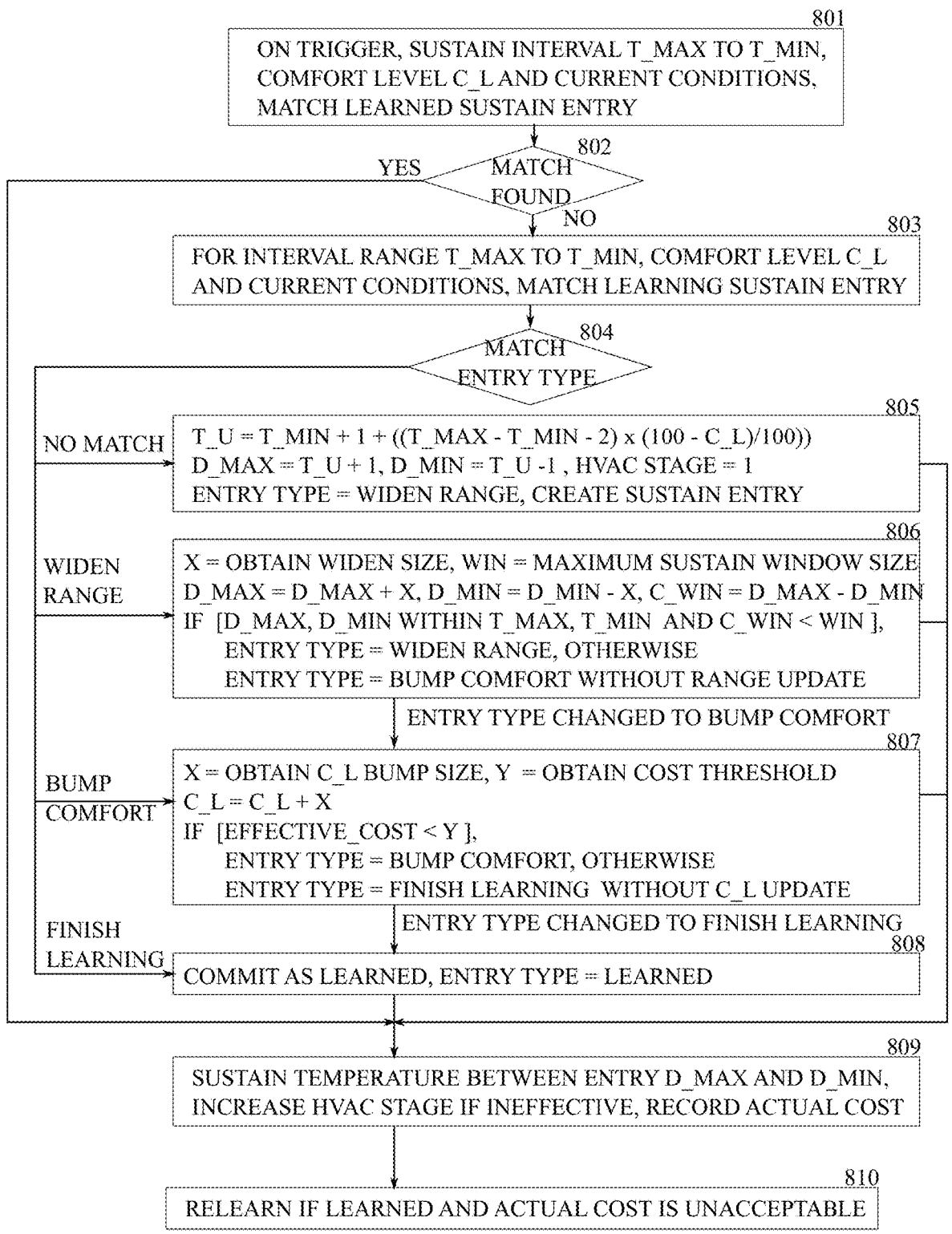
FIG. 8 illustrates a flowchart of a method to learn sustaining temperature within an interval of a thermostat schedule.

Refer now to FIG. 8 which illustrates flowchart of an exemplary method to learn sustaining temperature within an interval of a thermostat cooling schedule. Similar flowchart can be used for the heating system mode. The flowchart is used to process each sustain operation trigger.

In stage 801, find matching learned Sustain Entry 110 which corresponds to the current interval's maximum temperature Tmax, current interval's minimum temperature Tmin, current comfort level and current operation conditions.

In stage 802, determine if there are any matching learned Sustain Entry 110.

Stage 803 is reached if no matching learned Sustain Entry 110 were found during stage 802. In stage 803, find matching learning Sustain Entry 110 which corresponds to the current interval's maximum temperature Tmax, current interval's minimum temperature Tmin, current comfort level and current operation conditions.

In stage 804, determine an entry type of any matched learning Sustain Entry 110.

Stage 805 is reached if there is no matched learning Sustain Entry 110 in stage 804. In stage 805, a new learning Sustain Entry 110 is created using the estimated target temperature TU=Tmin+1+((Tmax−Tmin−2)×(100−CL)/100)), desired sustain temperature range Dmax=TU+1, Dmin=TU−1. The entry type of this created Sustain Entry 110 is set as Widen-Range.

Stage 806 is reached if the matched learning Sustain Entry 110 has entry type Widen-Range. In stage 806, the desired sustain temperature is widened incrementally in each iteration until entire range of temperature in the interval specification is covered or the sustain temperature range exceeds a predetermined maximum sustain temperature range. If the range is being widened in each iteration by X, Dmax=Dmax+X, Dmin=Dmin−X, provided TU+1≤Dmax≤Tmax and min≤Dmin≤TU−1 and Dmax−Dmin<Maximum sustain temperature range. The entry type is changed to Bump-Comfort if the range cannot be widened.

Stage 807 is reached if the matched learning Sustain Entry 110 has entry type Bump-Comfort or the stage 806 fails to widen sustain temperature range. In stage 807, the comfort level CL is increased incrementally in each iteration until the effective cost of sustain operation exceeds a fixed percentage of effective cost of using the best wide-range Sustain Entry 110. CL=CL+X, X being a fixed configured percentage by which comfort level is increased in each iteration. The y type is changed to Finish-Learning if the comfort level cannot be increased.

Stage 808 is reached if the matched learning Sustain Entry 110 has entry type Finish-Learning or the stage 807 fails to bump up the comfort level. In stage 808, the Sustain Entry 110 is committed and marked as learned. Henceforth, this entry may be used for creating the sustain operation under operating conditions that match the current operation conditions.

Stage 809 is reached on completion of stages 805, 806, 807, 808 and stage 802 if matching learned Sustain Entry 110 is found. in stage 809, create a sustain operation using the Dmax, Dmin and MAC stage. Sustain the temperature using this sustain operation. If temperature cannot be sustained, incrementally use a higher HVAC stage after a fixed duration. Record the Sustain Entry 110 including the actual effective cost of sustaining temperature in current interval.

In stage 810 relearn the Sustain Entry 110 if the actual cost of the sustain operation is unacceptable. During relearning, the current Sustain Entry 110 is used as the learning entry with entry type set to Widen-Range.

Figure 13:
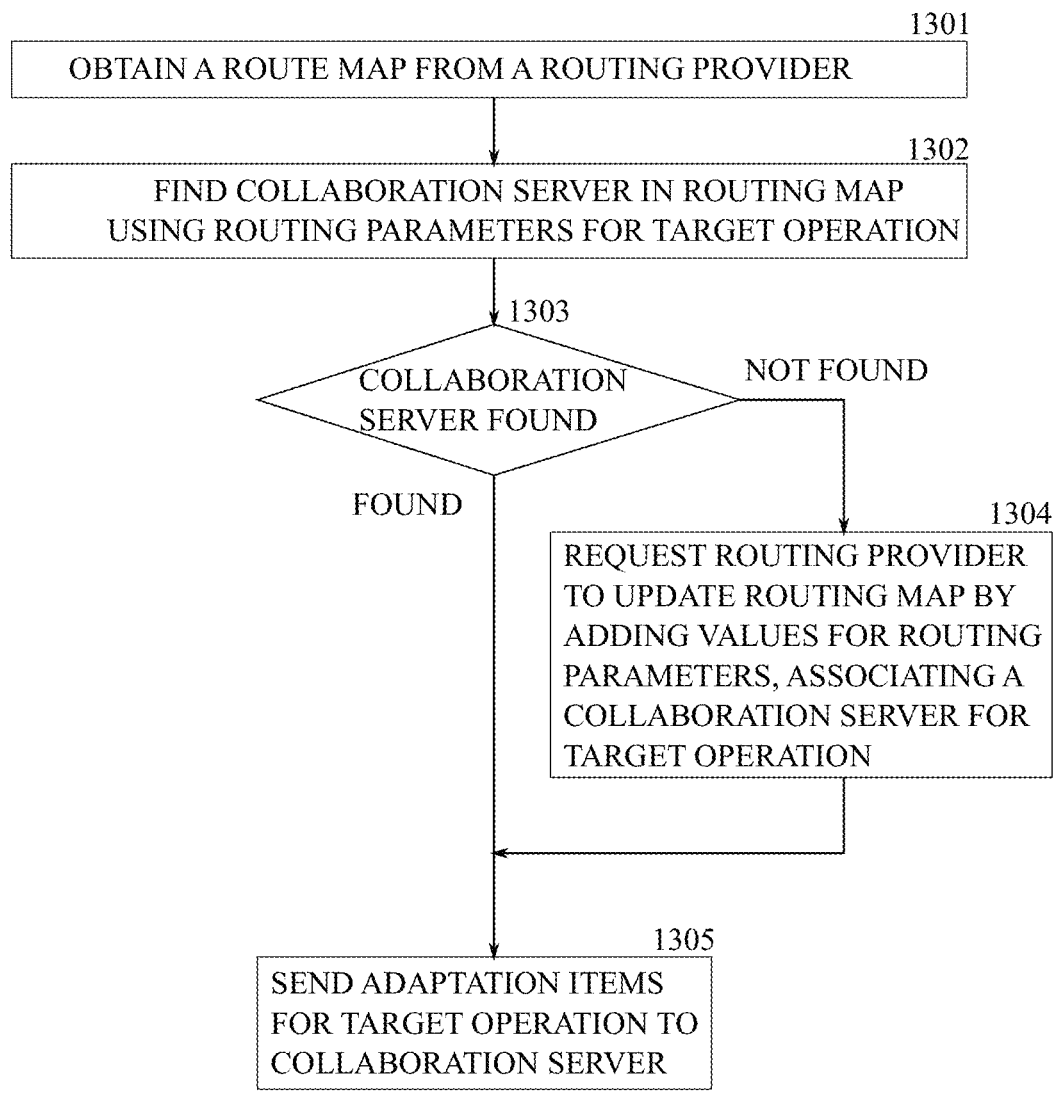
FIG. 13 illustrates flowchart of an exemplary method to request a collaboration server for determining the parameters for a target operation.

Refer now to FIG. 13 which illustrates flowchart of an exemplary method to request a collaboration server for determining the parameters for a target operation.

In stage 1301, obtain a route map from a routing provider. The routing map comprises association for values of routing parameters of a target operation with a collaboration server.

In stage 1302, identify a collaboration server by matching the values of the routing parameters as obtained for the target operation with the corresponding values associated with a collaboration server in the routing map.

In stage 1303, if the collaboration server is found, move to stage 1305. If the collaboration server is not found, move to stage 1304.

In stage 1304, the closest collaboration server for the routing parameters based on adaptation items is identified. The routing provider is requested to update the routing map by adding values for routing parameters so that the closest collaboration server is associated to the routing parameters based on the adaptation items of the target operation.

In stage 1305, a request for determining the parameters for the target operation is sent to the collaboration server found. The request comprises the adaptation items for the target operation.

Figure 14:
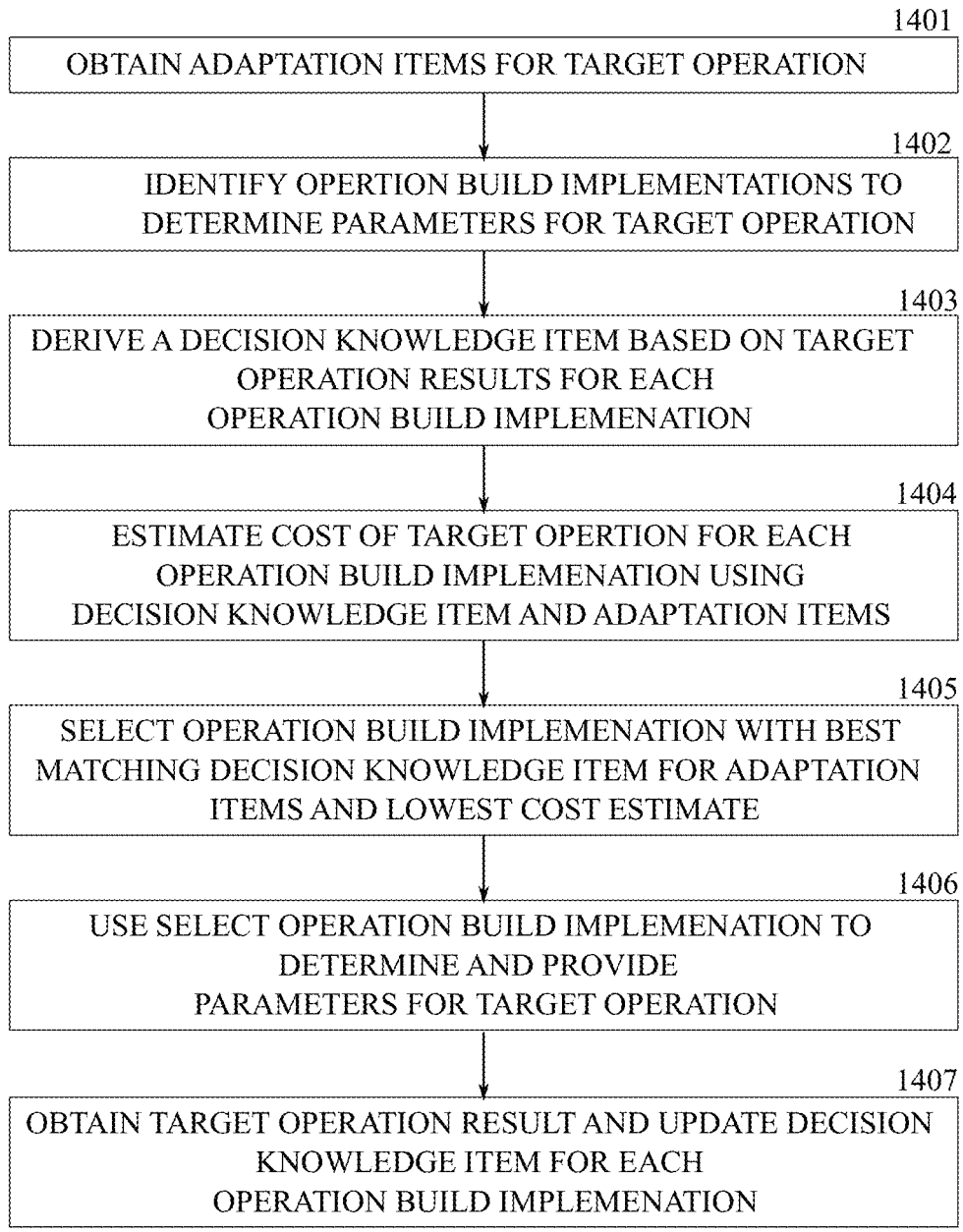
FIG. 14 illustrates flowchart of an exemplary method to determine the parameters for a target operation by a collaboration server.

Refer now to FIG. 14 which illustrates flowchart of an exemplary method to determine the parameters for a target operation by a collaboration server.

In stage 1401, obtain the adaptation items for the target operation from the request sent by the thermostat to determine the parameters for the target operation.

In stage 1402, identify operation build implementations that are capable of determining the parameters for the target operation.

In stage 1403, derive a decision knowledge item based on target operation results for similar past operations for each operation build implementation.

In stage 1404, estimate the cost of performing the target operation for each operation build implementation based on the decision knowledge item and the adaptation items for the target operation.

In stage 1405, select an operation build implementation that best matches the decision knowledge item for the adaptation items and with lowest estimated cost of performing the target operation.

In stage 1406, use the selected operation build implementation to determine the parameters for the target processing using the adaptation items for target operation and send these determined parameters for the target processing to the thermostat.

In stage 1407, obtain the result of performing the target operation with its parameters and use it to update the decision knowledge item for each operation build implementation.

Thus methods and systems for intelligent thermostat have been described. An embodiment that employs the techniques introduced above can simultaneously process one or more intelligent thermostats. The techniques introduced above can be implemented by using programmable circuitry programmed by software and/or firmware, or by using special-purpose hardwired circuitry, or by using a combination of such embodiments. Special-purpose hardwired circuitry may be in the form of, for example, one or more application-specific integrated circuits (ASICs), programmable logic devices (PLDs), field programmable gate arrays (FPGAs) etc.

Software or firmware that implement the techniques disclosed in this invention may be stored on a machine-readable medium and may be executed by one or more general purpose or special-purpose programmable microprocessors. A "machine-readable medium", as the term is used herein, includes any mechanism that can store information in a form accessible by a machine (a machine may be for example, a computer, network device, cellular phone, personal digital assistant (PDA), smart-phone, manufacturing tool, any device with one or more processors, etc). For example, a machine-accessible medium includes recordable/non-recordable media (e.g. read-only memory(ROM); random access memory (RAM); magnetic disk storage media; optical storage media; flash memory devices; solid state storage devices; etc.), and/or the like.

Although the present invention has been described with reference to specific exemplary embodiments, it will be recognized that the invention is not limited to the embodiments described, but can be practiced with modification and alteration within the spirit and scope of the embodiments disclosed in this invention. Accordingly, the specification and drawings are to be regarded in an illustrative sense rather than a restrictive sense.

Some embodiments of present disclosure are further described hereunder:

Embodiment 1

A system to regulate temperature for a zone of a building, the system comprising a memory, a sensor and a processor configured to obtain a first system mode from a schedule for a first interval, obtain a first comfort range of temperature and a first comfort level from the schedule for the first interval and obtain a thermal profile for the zone. The system controls an HVAC system to regulate a first temperature of the zone for the first interval, wherein to control the HVAC system, the processor is configured to obtain the first temperature of the zone and a plurality of zone conditions for the zone based on a sensor data item from the sensor for the first interval. To perform an adaptation processing for the first interval, the processor identifies a target processing to regulate the first temperature, wherein the target processing comprises a transit processing and a sustain processing. The transit processing transits the first temperature to a transit end temperature, the transit end temperature is above a minimum temperature of a transit comfort range of temperature for a heat system mode and is below a maximum temperature of the transit comfort range of temperature for a cool system mode. In order to perform the transit processing the processor is configured to perform a first transition of the first temperature at beginning of the first interval with the transit comfort range of temperature as the first comfort range of temperature. Alternatively the processor performs a second transition of the first temperature at end of the first interval, wherein to perform the second transition, the processor is configured to obtain a second comfort range of temperature for a second interval in the schedule, the second interval following the first interval and requiring temperature at start of the second interval as a temperature within the second comfort range of temperature and with the transit comfort range of temperature as the second comfort range of temperature. A sustain processing sustains the first temperature within the first comfort range of temperature. For the target processing, determine a plurality of parameters based on a plurality of adaptation items, the plurality of parameters comprising a time, a duration and at least one parameter of the HVAC system for performing the target processing, the plurality of adaptation items comprising a representation of the thermal profile, a representation of the schedule for the target processing, the plurality of zone conditions and a plurality of target processing results. The selection of the plurality of parameters for the target processing regulates the first temperature based on the first comfort range of temperature while minimizing energy use and maximizing user comfort. On determining the plurality of parameters for the target processing, operate the HVAC system to perform the target processing at the determined time and for the determined duration, thereby regulating the first temperature of the zone as specified by the schedule. Upon completion of the target processing, add a target processing result to the plurality of target processing results, wherein the target processing result comprises the plurality of parameters for the target processing, a representation of cost of the target processing and a change in a zone condition due to the target processing.

Embodiment 2

The system of embodiment 1, wherein to obtain the schedule the processor is further configured to define the schedule by a user; derive the schedule based on a behavior of a user; or any combination thereof.

Embodiment 3

The system of embodiment 1, wherein to obtain the thermal profile the processor is further configured to derive the thermal profile for the zone, to derive the thermal profile the processor is configured to determine a probe range of temperature based on lowest temperature and highest temperature in the schedule for the first system mode; operate the HVAC system for the first system mode using an HVAC system stage and determine a first time to change one degree for a unit temperature range in the probe range of temperature for the first system mode and the HVAC system stage; stop the operation of the HVAC system and determine a second time to change one degree for a unit temperature range in the probe range of temperature; and build the thermal profile based on the first time and the second time for the zone. Alternatively, the thermal profile of the zone is obtained from an external service wherein the external service is external to the system; or any combination thereof.

Embodiment 4

The system of embodiment 1, wherein the processor is further configured to obtain the sensor data item from the sensor for the first interval comprising an indoor humidity for the zone; an indoor temperature for the zone; an outdoor temperature; an outdoor humidity; or any combination thereof.

Embodiment 5

The system of embodiment 1, wherein to perform the transit processing, the processor is further configured to determine a transit HVAC stage, a transit begin time and a transit duration based on using a minimum HVAC stage of available plurality of HVAC system stages; and performing the transit processing that reaches the transit end temperature at a transit end time, wherein the processor minimizes interval between start of the first interval and the transit end time during the first transition and minimizes interval between start of the second interval and the transit end time during the second transition.

Embodiment 6

The system of embodiment 5, wherein to determine the transit HVAC stage, the transit begin time and the transit duration the processor is further configured to compute a maximum transit duration allowed for the transit processing based on a total duration of the first interval; find a matching transit entry from a plurality of transit entries that matches the first temperature and the plurality of zone conditions; derive the transit HVAC stage, the transit begin time and the transit duration based on the found matching transit entry; the thermal profile if the thermal profile contains a match for the first temperature and the plurality of zone conditions; or the maximum transit duration and lowest HVAC stage of the HVAC system if there is no matching transit entry and the thermal profile contains no match. Add a new transit entry to the plurality of transit entries upon completion of the transit processing, the new transit entry comprising the transit HVAC stage used for the transit processing and the transit duration as a duration for which the transit HVAC stage was operational during the transit processing.

Embodiment 7

The system of embodiment 1, wherein to perform the sustain processing, the processor is further configured to determine a sustain HVAC stage and a sustain range of temperature based on using a minimum HVAC stage of available plurality of HVAC system stages; operating the HVAC system with minimum startup and shutdown cycle during the duration for the sustain processing; and controlling the first temperature during the duration for the sustain processing to maximize user comfort and maintaining cost of the sustain processing within a predetermined bump threshold cost, wherein to maximize comfort the processor is configured to move the sustain range of temperature towards maximum temperature of the comfort range of temperature for a heat system mode of the first system mode; and move the sustain range of temperature towards minimum temperature of the comfort range of temperature for a cool system mode of the first system mode.

Embodiment 8

The system of embodiment 7, wherein the processor is further configured to determine the sustain HVAC stage and the sustain range of temperature based on one of these sustain entries. A matching learned sustain entry from a plurality of learned sustain entries if the matching learned sustain entry belongs to the plurality of learned sustain entries and matches the first comfort range of temperature, the first comfort level and the plurality of zone conditions. A no-matching sustain entry created and added to a plurality of learning sustain entries when no learning sustain entry matches the first comfort range of temperature, the first comfort level, and the plurality of zone conditions. Creating the no-matching widen sustain entry comprising computing a first target temperature based on the first comfort range of temperature and the first comfort level; determining the sustain range of temperature based on the first target temperature; determining a minimum HVAC stage to perform the sustain processing based on the thermal profile, the first target temperature and the plurality of zone conditions; setting a learning mode to widen; and setting the no-matching sustain entry as the learning sustain entry. A matching widen sustain entry, wherein the matching widen sustain is obtained by finding a candidate widen sustain entry from the plurality of learning sustain entries with the learning mode of widen and matching the first comfort range of temperature, the first comfort level, and the plurality of zone conditions; performing a widening of the sustain range of temperature by a widen amount if the sustain range of temperature remains within bounds of the first comfort range of temperature for the found candidate widen sustain entry and does not increase cost of the sustain processing beyond a predetermined widen threshold cost; updating the learning mode for the candidate widen sustain entry to bump comfort if it is not possible to widen the sustain range of temperature by the widen amount for the found candidate widen sustain entry or the widening of the sustain range of temperature increases cost of the sustain processing beyond the predetermined widen threshold cost; and using the candidate widen sustain entry found as the matching widen sustain entry; A matching bump comfort sustain entry, wherein the matching bump comfort sustain entry is obtained by finding a candidate bump comfort sustain entry from the plurality of learning sustain entries with the learning mode of bump comfort and matching the first comfort range of temperature, the first comfort level, and the plurality of zone conditions; performing an increase in comfort level of the candidate bump comfort sustain entry for the found candidate finish learning sustain entry provided cost of the sustain processing does not increase beyond a predetermined bump threshold cost; updating the learning mode for the candidate bump comfort sustain entry to finish learning for the found candidate finish learning sustain entry if increase in comfort level increases cost of the sustain processing beyond the predetermined widen threshold cost; and using the candidate bump comfort sustain entry found as the matching bump comfort sustain entry. A matching finish learning sustain entry, wherein the matching finish learning sustain entry is obtained by finding a candidate finish learning sustain entry from the plurality of learning sustain entries with the learning mode of finish learning and matching the first comfort range of temperature, the first comfort level, and the plurality of zone conditions; removing the candidate finish learning sustain entry from the plurality of learning sustain entries and adding the candidate finish learning sustain entry to the plurality of learned sustain entry; and using the candidate finish learning sustain entry found as the matching finish learning sustain entry.

Embodiment 9

The system of embodiment 1, wherein to determine the plurality of parameters for the target processing, the processor is further configured to use a functional logic; a fuzzy logic; a decision tree; a neural network based learning; a heuristics based learning; a reinforcement learning; or any combination thereof.

Embodiment 10

The system of embodiment 1, wherein the processor is further configured to determine the plurality of parameters for the target processing using the target processing result of a past target processing in the system; the target processing result of a past target processing in a different system different than the system; a software program that interfaces with the system; an additional processing implementation that can be loaded into the system; a computing platform that directly or indirectly interfaces with the system; or any combination thereof.

Embodiment 11

The system of embodiment 1, wherein the processor is configured to request a server processing performed by a serving processor based on a plurality of routing parameters, the serving processor is configured to perform the server processing to determine the plurality of parameters for the target processing, the plurality of routing parameters comprising the first temperature, the first comfort level, and the plurality of zone conditions.

Embodiment 12

The system of embodiment 11, wherein to request the server processing, the processor is configured to request to perform a route processing and obtain a routing map, wherein a route provider processor is configured to perform the route processing to create, update, and provide the routing map, the routing map associating a plurality of values for a routing parameter with a server processing; identify the server processing based on matching a value for a routing parameter of the target processing with the plurality of values for the routing parameter associated with the server processing by the routing map; request to perform the route processing for updating the routing map by adding a value to the plurality of values for a routing parameter associated with the server processing on learning a new association for the target processing with the serving processing; and provide the plurality of adaptation items to perform the server processing.

Embodiment 13

The system of embodiment 11, wherein to perform the server processing for the target processing, the serving processor is configured to: obtain the plurality of adaptation items for the target processing; identify a plurality of operation build implementations for determining the plurality of parameters for the target processing; derive a decision knowledge item based on the plurality of target processing results for an operation build implementation in the plurality of operation build implementations; estimate cost of the target processing for an operation build implementation in the plurality of operation build implementations based on the decision knowledge item and the plurality of adaptation items; select a final operation build implementation in the plurality of operation build implementations, the final operation build implementation matches the decision knowledge item for the plurality of adaptation items and has least estimate of cost of the target processing; use the final operation build implementation to determine the plurality of parameters for the target processing based on the plurality of adaptation items; and obtain the target processing result and update the decision knowledge item for an operation build implementation in the plurality of operation build implementations.

Embodiment 14

The system of embodiment 1, wherein the processor is further configured to regulate temperature of an elevated zone located in the building at a higher elevation than the zone; operate an upstream equalizer baffle to control a flow of air in an air duct from the zone to a return of the HVAC system for the elevated zone; operate a downstream equalizer baffle, to control a flow of air in an air duct from the elevated zone to a return of the HVAC system for the zone; and control the operation of the upstream equalizer baffle and the downstream. To control the upstream equalizer baffle and the downstream equalizer baffle the processor is configured to activate the upstream equalizer baffle to move cool air from the zone to the elevated zone when the zone system mode is a cool system mode and the elevated zone system mode is a cool system mode; and activate the downstream equalizer baffle to move hot air from the elevated zone to the zone when the zone system mode is a heat system mode and the elevated zone system mode is a heat system mode.

What is claimed is:

1. A system to regulate temperature for a zone of a dwelling, the system comprising a memory, a sensor and a processor configured to:
obtain a first system mode from a schedule for a first interval;
obtain a first comfort range of temperature and a first comfort level from said schedule for said first interval;
obtain a thermal profile for said zone; and
control an HVAC system to regulate a first temperature of said zone for said first interval, wherein to control said HVAC system, the processor is configured to:
obtain said first temperature of said zone and a plurality of zone conditions for said zone based on a sensor data item from the sensor for said first interval;
perform an adaptation processing for said first interval, wherein to perform said adaptation processing the processor is configured to:
identify a target processing to regulate said first temperature, wherein said target processing comprises:
a transit processing to transit said first temperature to a transit end temperature, said transit end temperature is above a minimum temperature of a transit comfort range of temperature for a heat system mode of said first system mode and is below a maximum temperature of said transit comfort range of temperature for a cool system mode of said first system mode, wherein to perform said transit processing the processor is configured to:
perform a first transition of said first temperature at beginning of said first interval with said transit comfort range of temperature as said first comfort range of temperature; or
perform a second transition of said first temperature at end of said first interval, wherein to perform said second transition, the processor is configured to obtain a second comfort range of temperature for a second interval in said schedule, said second interval following said first interval and requiring temperature at start of said second interval as a temperature within said second comfort range of temperature and with said transit comfort range of temperature as said second comfort range of temperature; or
a sustain processing to sustain said first temperature within said first comfort range of temperature; and
determine a plurality of parameters for said target processing based on a plurality of adaptation items, said plurality of parameters comprising a time, a duration and at least one parameter of said HVAC system for performing said target processing, said plurality of adaptation items comprising a representation of said thermal profile, a representation of said schedule for said target processing, said plurality of zone conditions and a plurality of target processing results, wherein selection of said plurality of parameters for said target processing regulates said first temperature based on said first comfort range of temperature while minimizing energy use and maximizing user comfort;
operate said HVAC system to perform said target processing at said time for said duration, whereby operating said HVAC system to perform said target processing regulates said first temperature of said zone as specified by said schedule; and
add a target processing result to said plurality of target processing results, wherein said target processing result comprises said plurality of parameters for said target processing, a representation of cost of said target processing and a change in a zone condition due to said target processing.

2. The system of claim 1, wherein to obtain said schedule the processor is further configured to:
define said schedule by a user;
derive said schedule based on a behavior of a user; or
any combination thereof.

3. The system of claim 1, wherein to obtain said thermal profile the processor is further configured to:
derive said thermal profile for said zone wherein, to derive said thermal profile the processor is configured to:
determine a probe range of temperature based on lowest temperature and highest temperature in said schedule for said first system mode;
operate said HVAC system for said first system mode using an HVAC system stage and determine a first time to change one degree for a unit temperature range in said probe range of temperature for said first system mode and said HVAC system stage;
stop said operation of said HVAC system and determine a second time to change one degree for a unit temperature range in said probe range of temperature; and
build said thermal profile based on said first time and said second time for said zone;
transfer said thermal profile of said zone from an external service wherein said external service is external to said system; or
any combination thereof.

4. The system of claim 1, wherein the processor is further configured to obtain said sensor data item from the sensor for said first interval comprising:
an indoor humidity for said zone;
an indoor temperature for said zone;
a temperature outside the dwelling;
a humidity outside the dwelling; or
any combination thereof.

5. The system of claim 1, wherein to perform said transit processing, the processor is further configured to determine a transit HVAC stage, a transit begin time and a transit duration based on:
using a minimum HVAC stage of available plurality of HVAC system stages; and
performing said transit processing that reaches said transit end temperature at a transit end time, wherein the processor minimizes interval between start of said first interval and said transit end time during said first transition and minimizes interval between start of said second interval and said transit end time during said second transition.

6. The system of claim 5, wherein to determine said transit HVAC stage, said transit begin time and said transit duration the processor is further configured to:

compute a maximum transit duration allowed for said transit processing based on a total duration of said first interval;

find a matching transit entry from a plurality of transit entries that matches said first temperature and said plurality of zone conditions;

derive said transit HVAC stage, said transit begin time and said transit duration based on:
  found said matching transit entry;
  said thermal profile if said thermal profile contains a match for said first temperature and said plurality of zone conditions; or
  said maximum transit duration and lowest HVAC stage of said HVAC system if there is no matching transit entry and said thermal profile contains no match; and add a new transit entry to said plurality of transit entries upon completion of said transit processing, said new transit entry comprising said transit HVAC stage used for said transit processing and said transit duration as a duration for which said transit HVAC stage was operational during said transit processing.

7. The system of claim 1, wherein to perform said sustain processing, the processor is further configured to determine a sustain HVAC stage and a sustain range of temperature based on:

using a minimum HVAC stage of available plurality of HVAC system stages;

operating said HVAC system with minimum startup and shutdown cycle during said duration for said sustain processing; and controlling said first temperature during said duration for said sustain processing to maximize user comfort and maintaining cost of said sustain processing within a predetermined bump threshold cost, wherein to maximize comfort the processor is configured to:
  move said sustain range of temperature towards maximum temperature of said comfort range of temperature for a heat system mode of said first system mode; and
  move said sustain range of temperature towards minimum temperature of said comfort range of temperature for a cool system mode of said first system mode.

8. The system of claim 7, wherein the processor is further configured to determine said sustain HVAC stage and said sustain range of temperature based on:

a matching learned sustain entry from a plurality of learned sustain entries if said matching learned sustain entry belongs to said plurality of learned sustain entries and matches said first comfort range of temperature, said first comfort level and said plurality of zone conditions;

a no-matching sustain entry, wherein said no-matching sustain entry is created and added to a plurality of learning sustain entries when no learning sustain entry matches said first comfort range of temperature, said first comfort level, and said plurality of zone conditions, creating said no-matching widen sustain entry comprising:
  computing a first target temperature based on said first comfort range of temperature and said first comfort level;
  determining said sustain range of temperature based on said first target temperature;
  determining a minimum HVAC stage to perform said sustain processing based on said thermal profile, said first target temperature and said plurality of zone conditions;
  setting a learning mode to widen; and
  setting said no-matching sustain entry as said learning sustain entry;

a matching widen sustain entry, wherein said matching widen sustain is obtained by:
  finding a candidate widen sustain entry from said plurality of learning sustain entries with said learning mode of widen and matching said first comfort range of temperature, said first comfort level, and said plurality of zone conditions;
  performing a widening of said sustain range of temperature by a widen amount if said sustain range of temperature remains within bounds of said first comfort range of temperature for said found candidate widen sustain entry and does not increase cost of said sustain processing beyond a predetermined widen threshold cost;
  updating said learning mode for said candidate widen sustain entry to bump comfort if it is not possible to widen said sustain range of temperature by said widen amount for said found candidate widen sustain entry or said widening of said sustain range of temperature increases cost of said sustain processing beyond said predetermined widen threshold cost; and
  using said candidate widen sustain entry found as said matching widen sustain entry;

a matching bump comfort sustain entry, wherein said matching bump comfort sustain entry is obtained by:
  finding a candidate bump comfort sustain entry from said plurality of learning sustain entries with said learning mode of bump comfort and matching said first comfort range of temperature, said first comfort level, and said plurality of zone conditions;
  performing an increase in comfort level of said candidate bump comfort sustain entry for said found candidate finish learning sustain entry provided cost of said sustain processing does not increase beyond a predetermined bump threshold cost;
  updating said learning mode for said candidate bump comfort sustain entry to finish learning for said found candidate finish learning sustain entry if increase in comfort level increases cost of said sustain processing beyond said predetermined widen threshold cost; and
  using said candidate bump comfort sustain entry found as said matching bump comfort sustain entry; or a matching finish learning sustain entry, wherein said matching finish learning sustain entry is obtained by:
  finding a candidate finish learning sustain entry from said plurality of learning sustain entries with said learning mode of finish learning and matching said first comfort range of temperature, said first comfort level, and said plurality of zone conditions;
  removing said candidate finish learning sustain entry from said plurality of learning sustain entries and adding said candidate finish learning sustain entry to said plurality of learned sustain entries; and
  using said candidate finish learning sustain entry found as said matching finish learning sustain entry.

9. The system of claim 1, wherein to determine said plurality of parameters for said target processing, the processor is further configured to use:

a functional logic;
a fuzzy logic;
a decision tree;
a neural network based learning;
a heuristics based learning;
a reinforcement learning; or
any combination thereof.

10. The system of claim 1, wherein the processor is further configured to determine said plurality of parameters for said target processing using:
said target processing result of a past target processing in said system;
said target processing result of a past target processing in a different system different than said system;
a software program that interfaces with said system;
an additional processing implementation that can be loaded into said system;
a computing platform that directly or indirectly interfaces with said system; or
any combination thereof.

11. The system of claim 1, wherein the processor is configured to request a server processing performed by a serving processor based on a plurality of routing parameters, said serving processor is configured to perform said server processing to determine said plurality of parameters for said target processing, said plurality of routing parameters comprising said first temperature, said first comfort level, and said plurality of zone conditions.

12. The system of claim 11, wherein to request said server processing, the processor is configured to:
request to perform a route processing and obtain a routing map, wherein a route provider processor is configured to perform said route processing to create, update, and provide said routing map, said routing map associating a plurality of values for a routing parameter with a server processing;
identify said server processing based on matching a value for a routing parameter of said target processing with the plurality of values for the routing parameter associated with the server processing by said routing map;
request to perform the route processing for updating said routing map by adding a value to said plurality of values for a routing parameter associated with said server processing on learning a new association for said target processing with said serving processing; and
provide said plurality of adaptation items to perform said server processing.

13. The system of claim 11, wherein to perform said server processing for said target processing, said serving processor is configured to:
obtain said plurality of adaptation items for said target processing;
identify a plurality of operation build implementations for determining said plurality of parameters for said target processing;
derive a decision knowledge item based on said plurality of target processing results for an operation build implementation in said plurality of operation build implementations;
estimate cost of said target processing for an operation build implementation in said plurality of operation build implementations based on said decision knowledge item and said plurality of adaptation items;
select a final operation build implementation in said plurality of operation build implementations, said final operation build implementation matches said decision knowledge item for said plurality of adaptation items and has least estimate of cost of said target processing;
use said final operation build implementation to determine said plurality of parameters for said target processing based on said plurality of adaptation items; and
obtain said target processing result and update said decision knowledge item for an operation build implementation in said plurality of operation build implementations.

14. The system of claim 1, wherein the processor is further configured to:
regulate temperature of an elevated zone located in said dwelling at a higher elevation than said zone;
operate an upstream equalizer baffle to control a flow of air in an air duct from said zone to a return input of the HVAC system for said elevated zone;
operate a downstream equalizer baffle, to control a flow of air in an air duct from said elevated zone to a return input of the HVAC system for said zone; and
control the operation of said upstream equalizer baffle and said downstream equalizer baffle wherein to control said upstream equalizer baffle and said downstream equalizer baffle the processor is configured to:
activate the upstream equalizer baffle to move cool air from said zone to said elevated zone when said zone system mode is a cool system mode and said elevated zone system mode is a cool system mode; and
activate the downstream equalizer baffle to move hot air from said elevated zone to said zone when said zone system mode is a heat system mode and said elevated zone system mode is a heat system mode.

15. A method to regulate temperature for a zone of a dwelling, the method executed by a processor to perform a plurality of operations, the method comprising:
obtaining a first system mode from a schedule for a first interval;
obtaining a first comfort range of temperature and a first comfort level from said schedule for said first interval;
obtaining a thermal profile for said zone; and
controlling an HVAC system to regulate a first temperature of said zone for said first interval, wherein controlling said HVAC system comprising:
obtaining said first temperature of said zone and a plurality of zone conditions for said zone based on a sensor data item from a sensor for said first interval;
performing an adaptation processing for said first interval, wherein said adaptation processing comprising:
identifying to perform a target processing to regulate said first temperature, wherein performing said target processing comprising:
performing a transit processing to transit said first temperature to a transit end temperature, said transit end temperature is above a minimum temperature of a transit comfort range of temperature for a heat system mode of said first system mode and is below a maximum temperature of said transit comfort range of temperature for a cool system mode of said first system mode, wherein said transit processing comprising:
performing a first transition of said first temperature at beginning of said first interval with said transit comfort range of temperature as said first comfort range of temperature; or
performing a second transition of said first temperature at end of said first interval, wherein performing said second transition comprises obtaining a second comfort range of temperature for a second interval in said schedule, said second interval following said first interval and requiring temperature at start of said second interval as a temperature within said second comfort range of temperature and with said transit comfort range of temperature as said second comfort range of temperature; or performing a sustain processing to sustain said first temperature within said first comfort range of temperature; and determining a plurality of parameters for said target processing based on a plurality of adaptation items, said plurality of parameters comprising a time, a duration and at least one parameter of said HVAC system for performing said target processing, said plurality of adaptation items comprising a representation of said thermal profile, a representation of said schedule for said target processing, said plurality of zone conditions and a plurality of target processing results, wherein selection of said plurality of parameters for said target processing regulates said first temperature based on said first comfort range of temperature while minimizing energy use and maximizing user comfort;

operating said HVAC system to perform said target processing at said time for said duration, whereby operating said HVAC system to perform said target processing regulates said first temperature of said zone as specified by said schedule; and adding a target processing result to said plurality of target processing results, wherein said target processing result comprises said plurality of parameters for said target processing, a representation of cost of said target processing and a change in a zone condition due to said target processing.

16. The method of claim 15, wherein obtaining said schedule comprises:
defining said schedule by a user;
deriving said schedule based on a behavior of a user; or
any combination thereof.

17. The method of claim 15, wherein obtaining said thermal profile further comprises:
deriving said thermal profile for said zone wherein, deriving said thermal profile comprises:
determining a probe range of temperature based on lowest temperature and highest temperature in said schedule for said first system mode;
operating said HVAC system for said first system mode using an HVAC system stage and determining a first time to change one degree for a unit temperature range in said probe range of temperature for said first system mode and said HVAC system stage;
stopping said operation of said HVAC system and determining a second time to change one degree for a unit temperature range in said probe range of temperature; and
dwelling said thermal profile based on said first time and said second time for said zone;
transferring said thermal profile of said zone using a service processor wherein said service processor is other than the processor; or
any combination thereof.

18. The method of claim 15, wherein obtaining said sensor data item from the sensor for said first interval comprising:
an indoor humidity for said zone;
an indoor temperature for said zone;
a temperature outside the dwelling;
a humidity outside the dwelling; or
any combination thereof.

19. The method of claim 15, wherein determining a transit HVAC stage, a transit begin time and a transit duration for said transit processing is based on:
using a minimum HVAC stage of available plurality of HVAC system stages; and
performing said transit processing to reach said transit end temperature at a transit end time, said transit processing minimizing interval between start of said first interval and said transit end time during said first transition and minimizing interval between start of said second interval and said transit end time during said second transition.

20. The method of claim 19, wherein determining said transit HVAC stage, said transit begin time and said transit duration the processor comprises:
computing a maximum transit duration allowed for said transit processing based on a total duration of said first interval;
finding a matching transit entry from a plurality of transit entries that matches said first temperature and said plurality of zone conditions;
deriving said transit HVAC stage, said transit begin time and said transit duration based on:
found said matching transit entry;
said thermal profile if said thermal profile contains a match for said first temperature and said plurality of zone conditions; or
said maximum transit duration and lowest HVAC stage of said HVAC system if there is no matching transit entry and said thermal profile contains no match; and
adding a new transit entry to said plurality of transit entries upon completion of said transit processing, said new transit entry comprising said transit HVAC stage used for said transit processing and said transit duration as a duration for which said transit HVAC stage was operational during said transit processing.

21. The method of claim 15, wherein determining a sustain HVAC stage and a sustain range of temperature for said sustain processing is based on:
using a minimum HVAC stage of available plurality of HVAC system stages;
operating said HVAC system with minimum startup and shutdown cycle during said duration for said sustain processing; and
controlling said first temperature during said duration for said sustain processing for maximizing user comfort and maintaining cost of said sustain processing within a predetermined bump threshold cost, wherein maximizing said user comfort comprises:
moving said sustain range of temperature towards maximum temperature of said comfort range of temperature for a heat system mode of said first system mode; and
moving said sustain range of temperature towards minimum temperature of said comfort range of temperature for a cool system mode of said first system mode.

22. The method of claim 21, wherein determining said sustain HVAC stage and said sustain range of temperature is based on:
- a matching learned sustain entry from a plurality of learned sustain entries if said matching learned sustain entry belongs to said plurality of learned sustain entries and matches said first comfort range of temperature, said first comfort level and said plurality of zone conditions;
- a no-matching sustain entry, wherein said no-matching sustain entry is created and added to a plurality of learning sustain entries when no learning sustain entry matches said first comfort range of temperature, said first comfort level, and said plurality of zone conditions, creating said no-matching widen sustain entry comprising:
  - computing a first target temperature based on said first comfort range of temperature and said first comfort level;
  - determining said sustain range of temperature based on said first target temperature;
  - determining minimum HVAC stage to perform said sustain processing based on said thermal profile, said first target temperature and said plurality of zone conditions;
  - setting a learning mode to widen; and
  - setting said no-matching sustain entry as said learning sustain entry;
- a matching widen sustain entry, wherein said matching widen sustain is obtained by:
  - finding a candidate widen sustain entry from said plurality of learning sustain entries with said learning mode of widen and matching said first comfort range of temperature, said first comfort level, and said plurality of zone conditions;
  - performing a widening of said sustain range of temperature by a widen amount if said sustain range of temperature remains within bounds of said first comfort range of temperature for said found candidate widen sustain entry and does not increase cost of said sustain processing beyond a predetermined widen threshold cost;
  - updating said learning mode for said candidate widen sustain entry to bump comfort if it is not possible to widen said sustain range of temperature by widen amount for said found candidate widen sustain entry or widening of said sustain range of temperature increases cost of said sustain processing beyond said predetermined widen threshold cost; and
  - using said candidate widen sustain entry found as said matching widen sustain entry;
- a matching bump comfort sustain entry, wherein said matching bump comfort sustain entry is obtained by:
  - finding a candidate bump comfort sustain entry from said plurality of learning sustain entries with said learning mode of bump comfort and matching said first comfort range of temperature, said first comfort level, and said plurality of zone conditions;
  - performing an increase in comfort level of said candidate bump comfort sustain entry for said found candidate finish learning sustain entry provided cost of said sustain processing does not increase beyond a predetermined bump threshold cost;
  - updating said learning mode for said candidate bump comfort sustain entry to finish learning for said found candidate finish learning sustain entry if increase in comfort level increases cost of said sustain processing beyond said predetermined widen threshold cost; and
  - using said candidate bump comfort sustain entry found as said matching bump comfort sustain entry; or
- a matching finish learning sustain entry, wherein said matching finish learning sustain entry is obtained by:
  - finding a candidate finish learning sustain entry from said plurality of learning sustain entries with said learning mode of finish learning and matching said first comfort range of temperature, said first comfort level, and said plurality of zone conditions;
  - removing said candidate finish learning sustain entry from said plurality of learning sustain entries and adding said candidate finish learning sustain entry to said plurality of learned sustain entries; and
  - using said candidate finish learning sustain entry found as said matching finish learning sustain entry.

23. The method of claim 15, further comprising determining said plurality of parameters for said target processing using:
- a functional logic;
- a fuzzy logic;
- a decision tree;
- a neural network based learning;
- a heuristics based learning;
- a reinforcement learning; or
- any combination thereof.

24. The method of claim 15, further comprising determining said plurality of parameters for said target processing using:
- said target processing result of a past target processing associated with said method;
- said target processing result of a past target processing associated with a different method different than said method;
- an additional processing that interacts with said method;
- a computing platform that directly or indirectly interacts with said method; or
- any combination thereof.

25. The method of claim 15, further comprising requesting a server processing by a serving processor based on a plurality of routing parameters, said server processing determining said plurality of parameters for said target processing, said plurality of routing parameters comprising said first temperature, said first comfort level, and said plurality of zone conditions.

26. The method of claim 25, wherein requesting said server processing comprises:
- requesting to obtain a routing map from a route provider processor, wherein said route provider processor performs said route processing to create, update, and provide said routing map, said routing map associating a plurality of values for a routing parameter with a server processing;
- identifying said server processing based on matching a value for a routing parameter of said target processing with the plurality of values for the routing parameter associated with the server processing by said routing map;
- requesting to update said routing map by said router provider processor by adding a value to said plurality of values for a routing parameter associated with said server processing on learning a new association for said target processing with said serving processing; and
- providing said plurality of adaptation items to perform said server processing.

27. The method of claim 25, wherein performing said server processing for said target processing comprises:
  obtaining said plurality of adaptation items for said target processing;
  identifying a plurality of operation build implementations for determining said plurality of parameters for said target processing;
  deriving a decision knowledge item based on said plurality of target processing results for an operation build implementation in said plurality of operation build implementations;
  estimating cost of said target processing for an operation build implementation in said plurality of operation build implementations based on said decision knowledge item and said plurality of adaptation items;
  selecting a final operation build implementation in said plurality of operation build implementations, said final operation build implementation matches said decision knowledge item for said plurality of adaptation items and has least estimate of cost of said target processing;
  using said final operation build implementation to determine said plurality of parameter for said target processing based on said plurality of adaptation items; and
  obtaining said target processing result for updating said decision knowledge item for an operation build implementation in said plurality of operation build implementations.

28. The method of claim 15, further comprising:
  regulating temperature of an elevated zone located in said dwelling at a higher elevation than said zone;
  operating an upstream equalizer baffle for controlling a flow of air in an air duct from said zone to a return input of the HVAC system for said elevated zone;
  operating a downstream equalizer baffle for controlling a flow of air in an air duct from said elevated zone to a return input of the HVAC system for said zone; and
  controlling the operation of said upstream equalizer baffle and said downstream equalizer baffle comprising:
    activating the upstream equalizer baffle to move cool air from said zone to said elevated zone when said zone system mode is a cool system mode and said elevated zone system mode is a cool system mode; and
    activating the downstream equalizer baffle to move hot air from said elevated zone to said zone when said zone system mode is a heat system mode and said elevated zone system mode is a heat system mode.

29. A computer program product comprising:
  a non-transitory computer readable storage medium comprising computer-readable program code bodied therewith executable by a processor to regulate temperature for a zone of a dwelling, the computer readable program code comprising:
  computer readable program code configured to obtain a first system mode from a schedule for a first interval;
  computer readable program code configured to obtain a first comfort range of temperature and a first comfort level from said schedule for said first interval;
  computer readable program code configured to obtain a thermal profile for said zone; and
  computer readable program code configured to control an HVAC system for regulating a first temperature of said zone for said first interval, wherein to control said HVAC system, the computer readable program code comprises:
    computer readable program code configured to obtain said first temperature of said zone and a plurality of zone conditions for said zone based on a sensor data item from a sensor for said first interval;
  computer readable program code configured to perform an adaptation processing for said first interval, wherein to perform said adaptation processing said computer readable program code is configured to:
    identify a target processing to regulate said first temperature, wherein said target processing comprises:
      a transit processing to transit said first temperature to a transit end temperature, said transit end temperature is above a minimum temperature of a transit comfort range of temperature for a heat system mode of said first system mode and is below a maximum temperature of said transit comfort range of temperature for a cool system mode of said first system mode, wherein to perform said transit processing the processor is configured to:
        perform a first transition of said first temperature at beginning of said first interval with said transit comfort range of temperature as said first comfort range of temperature; or
        perform a second transition of said first temperature at end of said first interval, wherein to perform said second transition, the processor is configured to obtain a second comfort range of temperature for a second interval in said schedule, said second interval following said first interval and requiring temperature at start of said second interval as a temperature within said second comfort range of temperature and with said transit comfort range of temperature as said second comfort range of temperature; or
      a sustain processing to sustain said first temperature within said first comfort range of temperature; and
    computer readable program code configured to determine a plurality of parameters for said target processing based on a plurality of adaptation items, said plurality of parameters comprising a time, a duration and at least one parameter of said HVAC system for performing said target processing, said plurality of adaptation items comprising a representation of said thermal profile, a representation of said schedule for said target processing, said plurality of zone conditions and a plurality of target processing results, wherein selection of said plurality of parameters for said target processing regulates said first temperature based on said first comfort range of temperature while minimizing energy use and maximizing user comfort;
  computer readable program code configured to operate said HVAC system to perform said target processing at said time for said duration, whereby operating said HVAC system to perform said target processing regulates said first temperature of said zone as specified by said schedule; and
  computer readable program code configured to add a target processing result to said plurality of target processing results, wherein said target processing result comprises said plurality of parameters for said target processing, a representation of cost of said target processing and a change in a zone condition due to said target processing.

* * * * *